US011953766B2

(12) United States Patent
Cheung et al.

(10) Patent No.: US 11,953,766 B2
(45) Date of Patent: Apr. 9, 2024

(54) PARITY TIME SYMMETRIC DIRECTIONAL COUPLERS WITH PHASE TUNING

(71) Applicant: HEWLETT PACKARD ENTERPRISE DEVELOPMENT LP, Houston, TX (US)

(72) Inventors: Stanley Cheung, Milpitas, CA (US); Geza Kurczveil, Santa Barbara, CA (US); Yuan Yuan, Milpitas, CA (US); Xian Xiao, Santa Barbara, CA (US); Raymond G. Beausoleil, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/843,352

(22) Filed: Jun. 17, 2022

(65) Prior Publication Data
US 2023/0408852 A1     Dec. 21, 2023

(51) Int. Cl.
*G02F 1/017* (2006.01)
(52) U.S. Cl.
CPC .................. *G02F 1/01708* (2013.01)
(58) Field of Classification Search
CPC ................................................ G02F 1/01708
See application file for complete search history.

(56) References Cited

U.S. PATENT DOCUMENTS

| | | | |
|---|---|---|---|
| 6,493,502 B1 | 12/2002 | Deliwala | |
| 10,133,097 B2 | 11/2018 | Reano et al. | |
| 10,586,847 B2 * | 3/2020 | Liang | H01L 21/76251 |
| 10,897,119 B1 * | 1/2021 | Kurczveil | H01S 5/0261 |
| 11,637,355 B1 * | 4/2023 | Zhang | H01P 1/32 |
| | | | 333/24.1 |
| 2017/0176780 A1 | 6/2017 | Levy et al. | |

OTHER PUBLICATIONS

Cao et al., "Fully integrated parity-time-symmetric electronics", Nature Nanotechnology, vol. 17, Mar. 2022, pp. 262-269.
Guo et al., "Observation of PT—Symmetry Breaking in Complex Optical Potentials", Physical Review Letters, Aug. 28, 2009, 4 pages.

(Continued)

*Primary Examiner* — Rhonda S Peace
(74) *Attorney, Agent, or Firm* — Sheppard Mullin Richter & Hampton LLP

(57) ABSTRACT

Implementations disclosed herein provide for devices and methods for obtaining parity time (PT) symmetric directional couplers through improved phase tuning, along with separate optical gain and optical loss tuning. The present disclosure integrates phase tuning and optical gain/loss tuning structures into waveguides of directional couplers disclosed herein. In some examples, directional couplers disclosed herein integrate one or more hybrid metal-oxide-semiconductor capacitors (MOSCAPs) formed by a dielectric layer between two semiconductor layers that provide for phase tuning via plasma dispersion and/or carrier accumulation depending on voltage bias polarity, and one or more optically active medium that provide for optical gain or loss tuning depending on voltage bias polarity.

20 Claims, 12 Drawing Sheets

(56) References Cited

OTHER PUBLICATIONS

Hiraki et al., "32-Gbit/s Heterogeneously Integrated Mach-Zehnder Modulator with 250μm-long III-V/Si MOS-capacitor Phase Shifter", IEEE, 2017, 3 pages.
Liang et al., "Heterogeneous silicon light sources for datacom applications", Optical Fiber Technology, 2018, 10 pages.
Lupu et al., "Switching using PT symmetry in plasmonic systems: positive role of the losses", Optical express, 2013, 19 pages.
Ruter et al., "Observation of Parity-Time Symmetry in Optical Systems", Quantum Optics, Dec. 2010, 2 pages.
Soref et al., "Electrooptical Effects in Silicon", IEEE Journal of Quantum Electronics, Jan. 1987, pp. 123-129.

* cited by examiner

PARITY TIME SYMMETRIC DIRECTIONAL COUPLERS WITH PHASE TUNING

STATEMENT OF GOVERNMENT RIGHTS

This invention was made with Government support under Agreement Number H98230-18-3-0001. The Government has certain rights in the invention.

BACKGROUND

Parity time (PT) symmetric directional couplers require a balance between gain and loss of the upper and lower waveguide to realize efficient optical switching. Tuning the gain and loss elements at the same time will induce a refractive index difference which can degrade the power extinction of the optical switch. By adding an independent hybrid metal-on-semiconductor capacitor (MOSCAP) we have an additional knob to tune the refractive index (optical phase) and achieve improved power extinction.

Current configurations do not have a means by which to independently control gain/loss and phase difference between the two legs.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
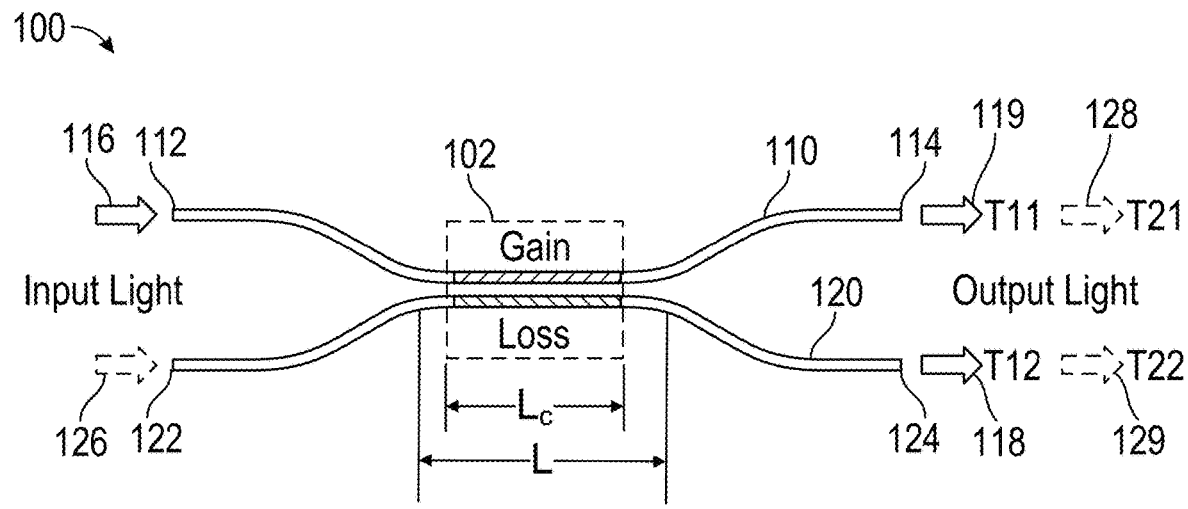
FIG. 1 illustrates an example directional coupler.

The figures are not exhaustive and do not limit the present disclosure to the precise form disclosed.

DETAILED DESCRIPTION

Examples provided herein are for devices and methods for obtaining parity time (PT) symmetric directional couplers. PT-symmetric directional couplers require a fine balance of gain to loss ratio between waveguides of the directional coupler to realize efficient optical switching. Accordingly, implementations disclosed herein provide for modulating optical loss of a first waveguide, separately from optical gain of a second waveguide, to enable tuning of the gain to lose ratio. Implementations herein also provide for modulating the optical gain of the second waveguide.

However, tuning the optical gain and/or optical loss may induce fluctuations in refractive indices of the waveguides, which can degrade the performance of the directional coupler. Thus, implementations herein integrate hybrid metal-oxide-semiconductor capacitors (MOSCAPs) into one or both waveguides, thereby enabling separate and simultaneous tuning of the refractive index. By the gain to loss ratio and refractive indices, implementations disclosed herein provide for PT symmetric directional couplers that can be used for efficient optical switching.

Examples of hybrid MOSCAPs utilized by the implementations disclosed herein may be formed by a thin dielectric layer between two semiconductor layers of different materials, each of which is formed in a waveguide of the implementations disclosed herein. In one example, the dielectric layer is an interfacial oxide layer between a bandgap III-V compound semiconductor material layer (referred to herein as a Group III-V material) and a silicon (Si) layer or other bandgap IV compound semiconductor layer (referred to herein as a Group IV material), such as germanium, silicon carbide, silicon germanium, and so on. A voltage bias applied to the MOSCAP provides for phase tuning via plasma dispersion or carrier accumulation effects depending on the bias polarity. For example, the carrier accumulation effect (with positive or forward voltage bias) may alter the phase and decrease the effective refractive index of the waveguide, whereas the plasma dispersion effect (with negative or reverse voltage bias) may increase the effective refractive index. Thus, control of the voltage bias applied to the MOSCAP according to the implementations disclosed herein enables changing the refractive index of a corresponding waveguide. The example hybrid MOSCAPs disclosed use standard Group III-V materials and can be fabricated along with components for modulating the gain or loss.

Realizing controllable and manufacturable PT-symmetric directional couplers with integrated hybrid MOSCAPs as described herein may significantly reduce the footprint of large scale optical neural networks, optical machine learning accelerators, programmable photonic networks, and RF-photonics. For example, directional couplers, including the implementations disclosed herein, may be utilized in Dense Wavelength Division Multiplexing (DWDM) photonic integration circuits (PIC). DWDM is an optical multiplexing technology used to increase bandwidth over existing fiber networks. The DWDM PIC architecture includes photonic devices fully integrating on a single manufacturing platform. Many devices on the PIC can be realized with higher performance and smaller footprint by using implementations disclosed herein that provide for improved optical switching and power splitting. For example, some conventional directional couplers that use thermal phase shifters for complete power transfer may be more than 75 um in length, while directional couplers that do not use thermal-based phase shifters can be on the order of millimeters in length. Whereas the devices and methods disclosed herein provide for ultra-short optical power splitters and switches as compared to conventional directional couplers. For example, implementations disclosed herein provide for PT symmetric directional couplers that are capable of light manipulation at the nanoscale and comprise subwavelength components. As an illustrative example, the implementations disclosed herein may provide for directional couplers that can have a length on the order of 25 μm or smaller depending on the gain to loss ratio achieved. Thus, the footprint required for the implementations disclosed herein is significantly reduced as compared to conventional directional couplers, while also providing efficient switching and power splitting enabled by PT symmetric directional couplers.

Furthermore, the fabrication of implementations disclosed herein is fully compatible with existing and future PIC design without additional processes. For example, the MOSCAPs utilized in the directional couplers disclosed herein may be formed using fabrication techniques and processes that integrate with fabrication processes of the various components that make up PICs (e.g., lasers, modulators, detectors, and so on). Thus, implementations herein may not complicate the manufacturing and/or assembly of PICs and other systems that utilize the devices disclosed herein.

As alluded to above, operation of PT symmetric directional couplers requires a fine balance of the gain to loss ratio within the directional coupler. Current systems do not have a means for adjusting the optical loss to tune the gain to loss ratio. For example, one exemplary current system introduces gain via a gallium arsenide (GaAs) or aluminum gallium arsenide (AlGaAs) material with a fixed loss provided by a chromium (Cr) metal absorption. Another exemplary system uses a lithium niobate (LiNO3) platform and optical pumping via an amplitude mask. These existing systems may introduce gain, but with fixed loss, and they do not provide a means for modulating the optical loss. Additionally, as noted above, changes in gain to loss ratio induce changes in the refractive index that degrades the performance of the system, and existing directional couplers fail to provide a means for tuning the refractive index separately from the gain or loss. Implementations disclosed herein utilize MOSCAP as phase shifts that provide a lower modulation efficiency $V_\pi L$ than that provided by traditional phase shifts, for example, $V_\pi L < 0.3$ V per cm.

Accordingly, implementations disclosed herein provide for separately tunable gain and loss, while simultaneously providing for tuning of the phase and refractive index. By utilizing the implementations disclosed herein, high performance PT symmetric directional couplers can be obtained on silicon photonic platforms, which can provide for ultra-short optical switches and power splitters compared to traditional directional couplers. As a result, the footprint of large-scale systems can be reduced. Additionally, the refractive index tuning provided by hybrid MOSCAPs as disclosed herein offers ultra-low power operation compared to other existing used phase shifters such as micro-heaters, for example, $V_\pi L < 0.3$ V per cm while consuming power on the scale of nano-Watts.

Additionally, implementations herein allow for unity matrix transformations, which are important to neural networks. Unitary matrix transformations require lossless components. Implementations herein can utilize optical gain to compensate for optical loss within a system, thereby achieving lossless components required to realize unity matrix transformations. Accordingly, the implementations herein are applicable and may be implemented as part of neural network systems.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example directional coupler 100. The directional coupler 100 depicts an example 2×2 directional optical coupler including a first waveguide 110 and a second waveguide 120. The first waveguide 110 comprises an input port 112 and an output port 114. The second waveguide 120 comprises an input port 122 and an output port 124. The first waveguide 110 defines a first leg of the directional coupler 100 and the second waveguide 120 defines a second leg of the directional coupler 100. The directional coupler 100 may be employed as an optical switch or other optical device.

The directional coupler 100 includes a coupling region 102 having a coupling length $L_c$. Within the coupling region, light propagating in one waveguide can be tapped off into the other waveguide (e.g., a portion of light propagating in one waveguide is transferred into the other waveguide). The tapped off portion of light may then propagate in the other waveguide and output via the output port of the other waveguide. Additionally, the portion of light that remains in the one waveguide may be output from the output port of the one waveguide. Furthermore, the light outputted from either output port may be dependent on propagation losses, such as but not limited to, excess loss (e.g., ratio of the total input power to the total output power); polarization dependent loss (e.g., ratio of the maximum and minimum transmissions due to polarization states in couplers); optical return loss/directivity (e.g., the fraction of input light that exits through an input port instead of the intended output port); insertion loss (e.g., ratio of the input power to the output power at one of the output ports of the coupler, and in the case of a 2×2 coupler insertion loss can be determined for each output port).

The amount of light tapped off into the other waveguide may be dependent on the coupling ratio between the two waveguides (e.g., 50:50, 90:10, or any coupling ratio desired for a given application). Coupling ratio is the ratio of the optical power from each output port to the sum of the total power of both output ports as a function of wavelength. The coupling ratio can be calculated from the measured insertion loss (e.g., the loss of signal power resulting from the insertion of a device in a transmission line or optical fiber and expressed in decibels (dB)).

As an example, first light 116 is input into the input port 112 of the first waveguide 110 and propagates toward the coupling region 102. Within the coupling region 102, at least a portion 118 of the first light 116 is transferred to the second waveguide 120, based on the coupling ratio of the directional coupler 100. The transferred portion 118 is then output via the output port 124 having a transmitted light intensity matrix $T^{12}$, as described below. The remaining portion 119 of the first light 116 propagating in the first waveguide 110 is output via the output port 114 having a transmitted light intensity matrix $T^{11}$. The output power at each output port 114 and 124 may be based on one or more losses as set forth above.

In another example, second light 126 is input into the input port 122 of the second waveguide 120 and propagates toward the coupling region 102. Within the coupling region 102, at least a portion 128 of the second light 126 is transferred into the first waveguide 110, based on the coupling ratio of the directional coupler 100. The transferred portion 128 is then output via the output port 114 having a transmitted light intensity matrix $T^{21}$. The remaining portion 129 of the first light 116 propagating in the first waveguide 110 is output via the output port 124 having a transmitted light intensity matrix $T^{22}$. In one case, the second light may be input into the directional coupler 100 in place of the first light 116. In another case, the second light 126 may be input into the directional coupler 100 at the same time as the first light 116, or in alternating pulses of light. In this case, the output port 114 may output the remaining portion 119 of the first light 116 and transferred portion 128 of the second light 126, while the output port 124 outputs the transferred portion 118 of the first light 116 and the remaining portion of the second light 129.

A directional coupler may be implemented as a PT symmetric directional coupler, for example, based on a gain to loss ratio between the waveguides. The development of recent nanofabrication technologies prompted the emergence of artificial structures such as PT symmetric devices that utilize PT symmetry. PT symmetric devices are capable of light manipulation at the nanoscale and may comprise subwavelength components that shrink the miniaturization gap between photonics and electronics. While the propagation losses, such as those introduced above, are generally considered as harmful in optical systems, propagation losses may serve a positive role in optical devices, for example, in providing PT symmetric directional couplers.

Figure 6A:
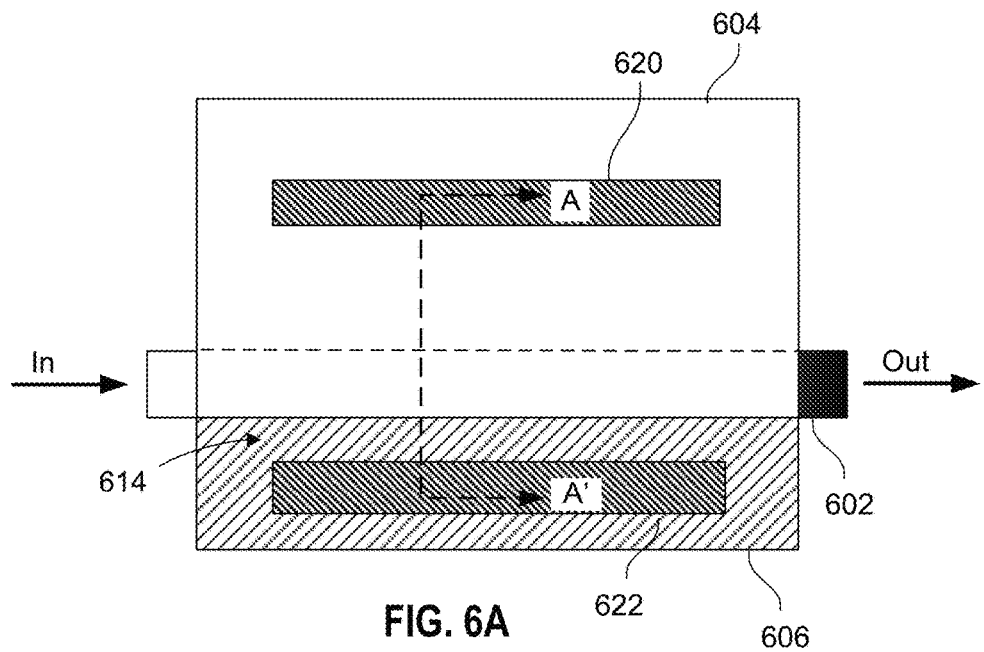
FIGS. 6A and 6B illustrate an example metal oxide semiconductor (MOS) optical modulator that may be implemented in the technology disclosed herein.

PT symmetric directional couplers can operate as efficient directional couplers (e.g., optical switches) when a certain amount of loss is introduced into the system. With reference to FIG. 1, the directional coupler 100 can be implemented as a PT symmetric directional coupler by introducing optical gain into the first waveguide 110 (referred to herein as a gain waveguide) and introducing optical loss (e.g., propagation loss) into the second waveguide 120 (referred to herein as a loss waveguide). FIGS. 6A-provide example directional couplers for introducing optical gain and optical loss into coupled waveguides.

By varying the gain and loss levels in each waveguide relative to one another (e.g., varying gain to loss ratio within the coupling region 102), a PT symmetric directional coupler can be obtained, whereby the output signal from the directional coupler can be abruptly modulated based on slight changes in the gain to loss ratio. This property stems from the eigenvalues of both waveguides that coalesce when gain to loss ratio reaches a critical threshold value (referred to herein as an exceptional point). The exceptional point has a singular nature, which provides for abrupt changes in the eigenvalues from real to imaginary axis responsive to small changes in the gain to loss ratio. Thus, a large differential gain can be achieved with a modest variation of the gain and/or loss that changes the gain to loss ratio in the vicinity of the exceptional point. For example, PT symmetric directional couplers can dynamically switch light output at output port 114 from first light 116 input into first waveguide 110 to second light 126 input into second waveguide 122 through a slight modulation of the gain and/or loss to tune the gain to loss ratio between the waveguides in coupling region 102. The intensity of light output from such a PT symmetric directional coupler may be the same as or approximately the same as the intensity at the input, regardless of which light is output from the system.

Figures 2A, 2B:
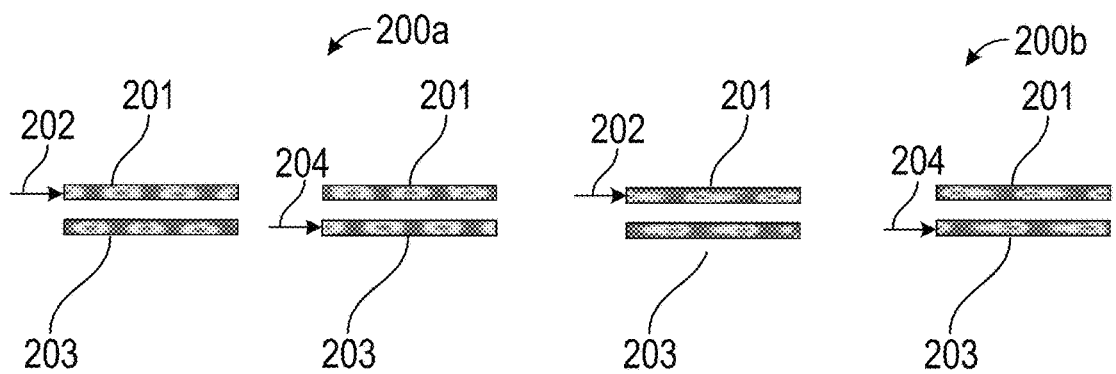
FIGS. 2A-2C illustrate optical wave propagations in example directional couplers.
Figure 2C:
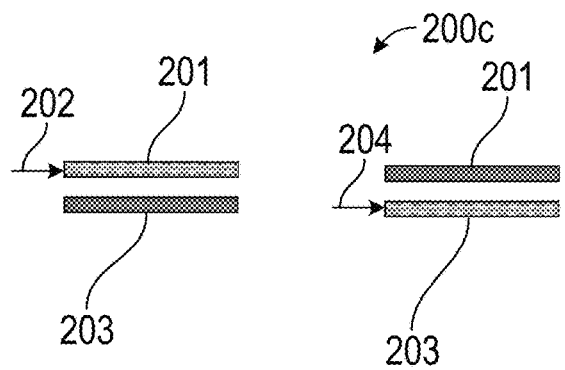

For example, FIG. 2A-2C illustrate optical wave propagations in an example conventional directional coupler (FIG. 2A) and an PT symmetric directional coupler, where the gain to loss ratio is below the exceptional point (FIG. 2B) and equal to or above the exceptional point (FIG. 2C). FIGS. 2A-2C illustrates how light input into a directional coupler is transferred under different operating conditions. FIGS. 2A-2C illustrate directional couplers 200a-200c, respectively. Each directional coupler 200a-200c (collectively referred to herein as directional coupler 200) is substantially the same, having a first waveguide 201 and a second waveguide 203, except the gain to loss ratio is attenuated between FIGS. 2A-2C within the vicinity of the exceptional point.

In the conventional directional coupler 200a of FIG. 2A, propagation losses are minimized, and no gain added to the system. In this case, light input into a first waveguide 201 (as shown by arrow 202) is transferred the second waveguide 203, for example, as described above. Light transferred from the first waveguide 201 to the second waveguide 203 is reciprocal in nature (e.g., there is path dependence), such that input light is output from both waveguides. Similarly, light input into the second waveguide (as shown by arrow 204) is transferred to the first waveguide 201 having a reciprocal nature.

In the PT symmetric directional coupler 200b of FIG. 2B, loss and gain are added to the system such that the gain to loss ratio is below the exceptional point. In directional coupler 200b, the first waveguide 201 has gain added to the light propagating therein and the second waveguide 203 introduces loss. In this case, light input into a first waveguide 201 (as shown by arrow 202) is transferred to the second waveguide 203, for example, as described above. In this case, the output power is dependent on the previous path taken. Thus, power at the output of each waveguide is dependent on which waveguide the light was input into.

In the PT symmetric directional coupler 200c of FIG. 2C, loss and gain are added to the system such that the gain to loss ratio is at or above the exceptional point. As in FIG. 2B, the first waveguide 201 of directional coupler 200b introduces gain and the second waveguide 203 introduces loss. In this case, the reciprocal nature ceases to occur and output power can be completely switched regardless of coupling length and is independent on the previous path taken (e.g., regardless of which waveguide light is input into, the output power will always come out of the waveguide 201 in these examples). For example, light of arrow 202 input into first waveguide 201 does not transfer to the second waveguide 203, while light of arrow 204 input into the second waveguide 203 is completely transferred (e.g., switches) to the first waveguide 201. Thus, output power can be substantially completely switched between light input into each respective waveguide (e.g., approximately 100% of the input light will output from the gain waveguide). For example, as described in more detail in connection with FIG. 3A, under certain conditions an output on the loss waveguide can be as low as −50 dB, which may be substantially close to zero meaning substantially all of the power is output from the gain waveguide.

PT symmetric directional couplers can dynamically switch light from one waveguide to the other, delivering the substantially the same output intensity as that injected into an input waveguide. The light output from such a PT symmetric directional coupler can be modeled by a transfer matrix for a given coupling length $L_c$, which is defined by $$\frac{\pi/2}{\kappa}.$$

The transfer matrix M(z), with coefficients mil, of such a directional coupler is provided as:

$$M(z) = \begin{pmatrix} \cos(\Omega z) - \frac{i\beta}{\Omega}\sin(\Omega z) & \frac{i\kappa}{\Omega}\sin(\Omega z) \\ \frac{i\kappa}{\Omega}\sin(\Omega z) & \cos(\Omega z) + \frac{i\delta}{\Omega}(\Omega z) \end{pmatrix} \exp\left(\frac{g_1 - \chi_2}{2}z\right) \quad \text{Eq. 1}$$

where z is the propagation distance, K is the coupling coefficient, $g_1$ is the gain introduced by a first waveguide (e.g., waveguide 110), $\chi_2$ (which may also be referred to as $-g_2$) is the propagation loss introduced by a second waveguide (e.g., waveguide 120), and $\Omega$, a variable representative of a detuning of the coupling coefficient, is provided as:

$$\Omega = \sqrt{\delta^2 + \kappa^2} \quad \text{Eq. 2}$$

$\delta$ is the detuning of the waveguides propagation constants ($\beta_j$) in the presence of the combined gain/loss, which is provided by:

$$\delta = \frac{\beta_1 + ig_1 - (\beta_2 - i\chi_2)}{2} = \frac{\beta_1 - \beta_2}{2} + i\Delta_{im} \quad \text{Eq. 3}$$

where $\beta_1$ is the propagation constant of the first waveguide, $\beta_2$ is the propagation constant of the second waveguide, and $\Delta_{im}$ is the combined imaginary detuning (e.g., |gain|+|loss|). $\Delta_{im}$ is provided as:

$$\Delta_{im} = \frac{g_1 + \chi_2}{2} \quad \text{Eq. 4}$$

From Eqs. 1-4 the transmitted light intensity matrix at the output of the j-th waveguide for light injected through the i-th waveguide, where z is the coupling length, $L_c$, responding to a complete crossover from one waveguide to the other for $\delta=0$ ($\Omega=\kappa$), can be provided by:

$$T^{ij} = |M_{ij}|^2 \quad \text{Eq. 5}$$

Thus, with reference to FIG. 1, using the above equations, transmitted light intensity matrix for output light portion 118 (e.g., first light 116 input into first waveguide 110 and transferred to and output from the second waveguide 120) can be calculated as $T^{12}$. Similarly, transmitted light intensity matrix for output light portion 119 (e.g., first light 116 input into first waveguide 110 and output from the first waveguide 110) can be calculated as $T^{11}$; transmitted light intensity matrix for output light portion 128 (e.g., second light 126 input into second waveguide 120 and transferred to and output from the first waveguide 110) can be calculated as $T^{21}$; and transmitted light intensity matrix for output light portion 129 (e.g., second light 126 input into second waveguide 120 and output from the second waveguide 120) can be calculated as $T^{22}$.

As alluded to above, operation of PT symmetric directional couplers requires balancing of the gain and loss of the respective waveguides to achieve a gain to loss ratio that is at or exceeds the exceptional point. When such conditions are met, PT symmetric directional couplers can realize efficient optical switching (e.g., optical switching using shorter device lengths than conventional directional couplers). However, tuning the gain and loss of respective waveguides, at the same time, induces a refractive index difference. For example, tuning the gain and/or loss is related to Kramer's Kronig relation and with linewidth enhancement factor, as are known in the art. Additionally, tuning gain also induces heat which will change refractive index within the waveguide.

Figure 3B:
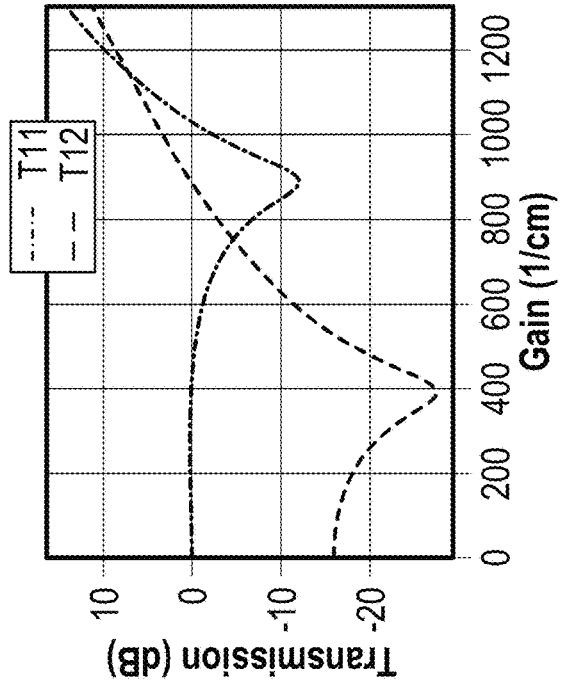
FIGS. 3A-3C illustrate transmissions of an example Parity Time (PT) symmetric directional coupler at varying refractive index differences between a gain waveguide and a loss waveguide.
Figure 3C:
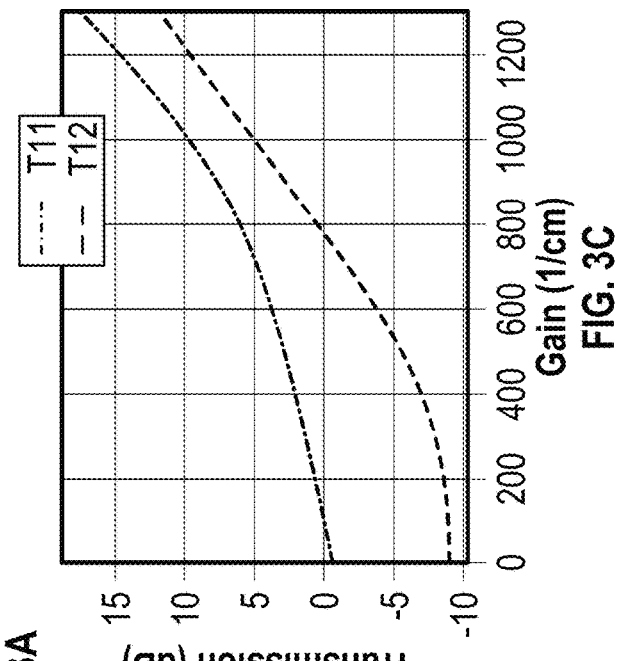
Figure 3A:
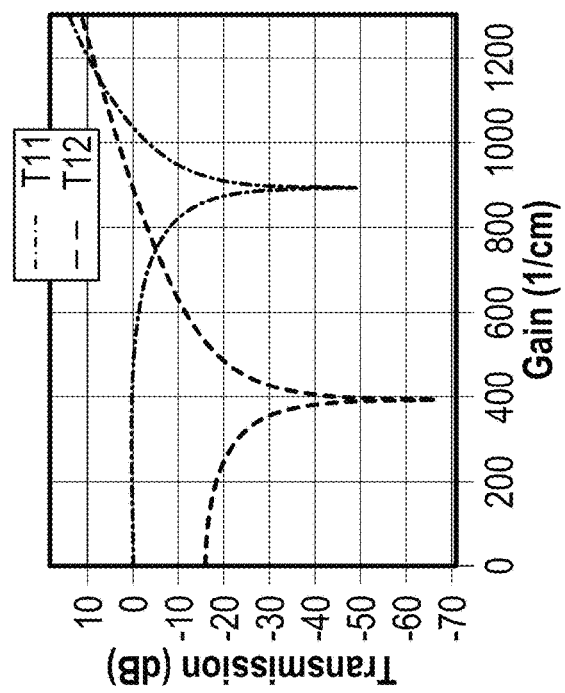

FIGS. 3A-3C illustrate transmissions of an example PT symmetric directional coupler at varying refractive index differences between a gain waveguide and a loss waveguide. FIGS. 3A-3C are simulations where light is input into a gain waveguide and the power of transmitted light output from the gain waveguide (e.g., matrix $T^{11}$ calculated according to Eq. 1-5 above) and output from the loss waveguide (e.g., matrix $T^{12}$) are plotted as a function of gain added by the gain waveguide, with loss added by the loss waveguide held constant. In each of FIGS. 3A-3C, certain parameters were held constant, for example, the coupling length ($L_c$) was 25 µm, light wavelength (λ) was 1.31 µm, the actual length of the gain to loss section L was 2.1 times $L_c$ (note labeling of L and $L_c$ in FIG. 1 are not drawn to scale and are provided for illustrative purposes only), and loss introduced was −10 cm$^{-1}$. The difference in refractive index (Δn) between the gain waveguide and the loss waveguide was 10e$^{-6}$, 10e$^{-4}$, and 10e$^{-3}$ for FIGS. 3A, 3B, and 3C, respectively.

FIGS. 3A-3C illustrate power extinctions and exceptional points as a function of gain to loss ratio for each difference in refractive index (Δn). FIG. 3A illustrates power extinction 302 at a gain of approximately 870 cm$^{-1}$ for transmitted light intensity matrix $T^{11}$, power extinction 304 at a gain of approximately 399 cm$^{-1}$ for transmitted light intensity matrix $T^{12}$, and exceptional point 310 at a gain of approximately 1125 cm$^{-1}$, where light is input into a gain waveguide (e.g., waveguide 110) of a directional coupler. FIG. 3B illustrates power extinction 312 at a gain of approximately 870 cm$^{-1}$ for transmitted light intensity matrix $T^{11}$, power extinction 314 at a gain of approximately 399 cm$^{-1}$ for transmitted light intensity matrix $T^{12}$, and exceptional point 320 at a gain of approximately 1125 cm$^{-1}$, where light is input into a gain waveguide (e.g., waveguide 110) of a directional coupler. As seen from FIGS. 3A and 3B, a difference in refractive index of 10e$^{-6}$ provides a power extinction of better than negative 40 dB (e.g., almost negative 50 dB for $T^{11}$ and almost negative 70 dB for $T^{12}$. However, as the difference in the refractive index increases, the power extinction degrades, as shown in FIG. 3B, where the power extinctions 312 and 314 are just over −10 dB and approximately −25 dB, respectively. Further, when the difference in refractive index is too large (e.g., 10e$^{-3}$ of FIG. 3C), the power extinction and exceptional point are no longer present.

FIGS. 4A-4D illustrate example heat maps depicting transmission intensity matrix ($T^{ij}$) for an example PT symmetric directional coupler, where the difference in the refractive index between the gain and loss waveguides is 10e$^{-6}$. The plots $T^{11}$ and $T^{12}$ of FIG. 3A may each correspond to a horizontal slice taken from $T^{11}$ of FIG. 4A and $T^{12}$ of FIG.

Figure 4A:
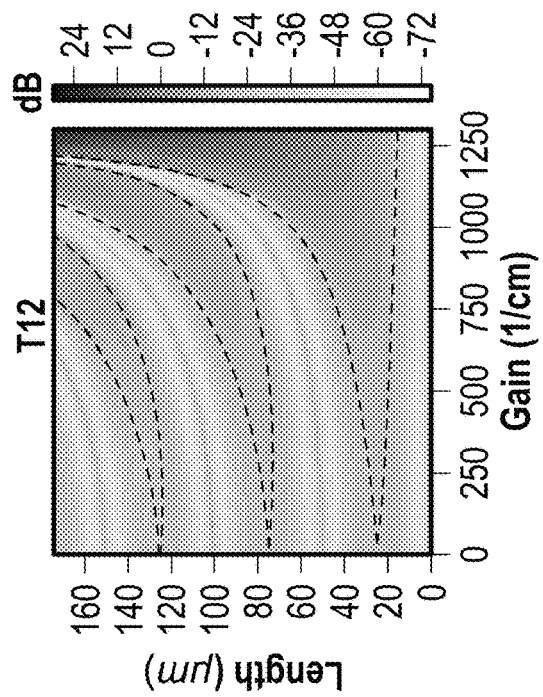
FIGS. 4A-4D illustrate example heat maps depicting transmission intensity matrix for an example PT symmetric directional coupler having a difference in the refractive index between the gain and loss waveguides.
Figure 4B:
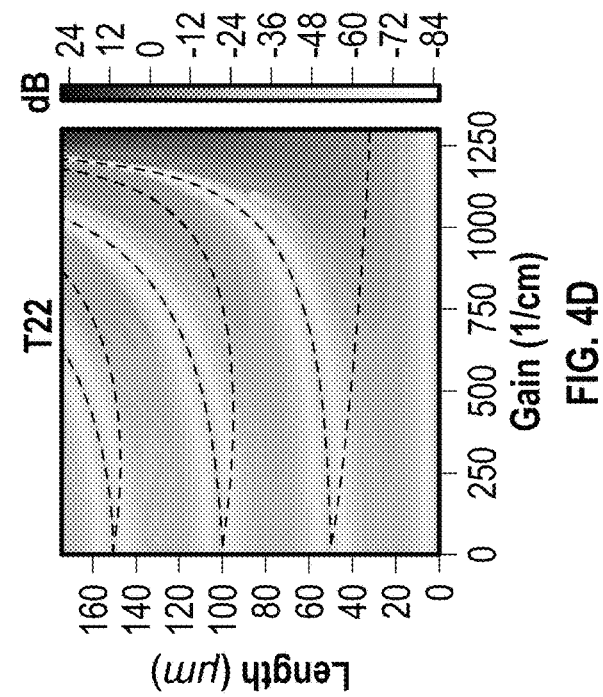
Figure 4C:
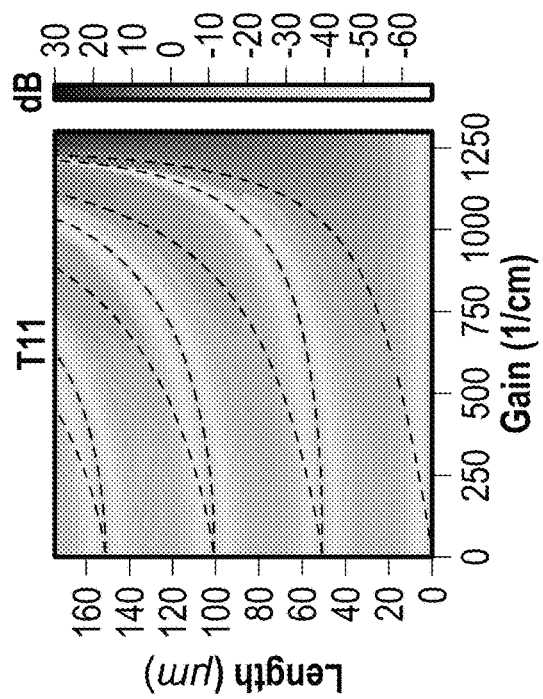
Figure 4D:
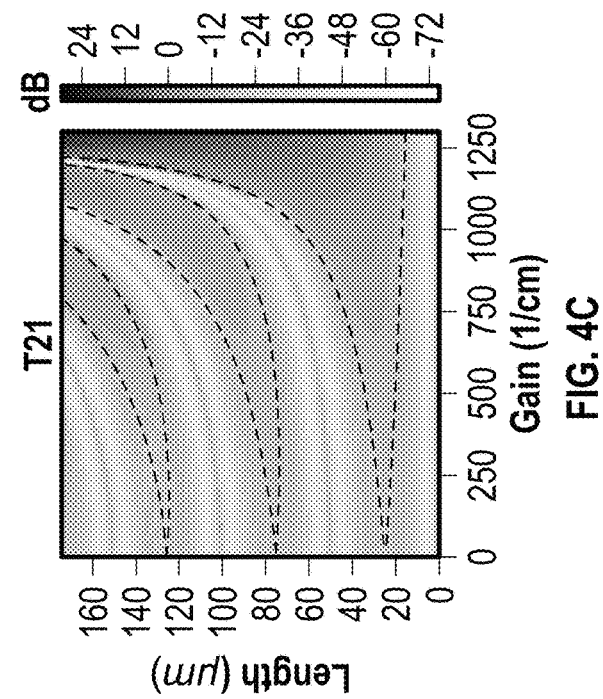
Figure 5A:
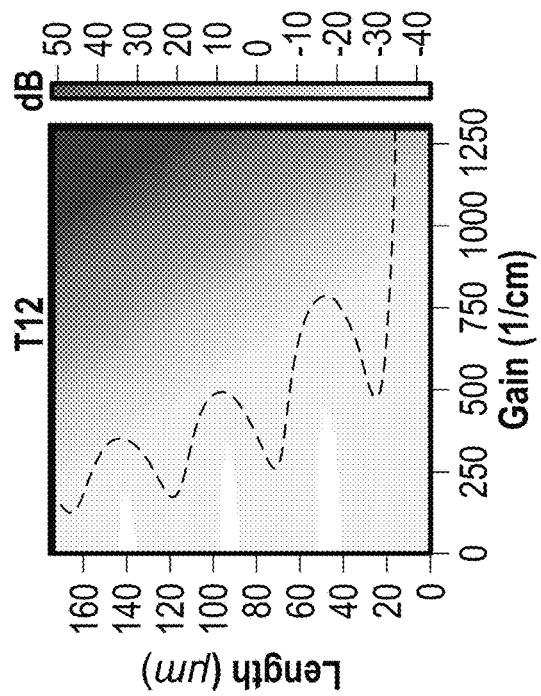
FIGS. 5A-5D illustrate example heat maps depicting transmission intensity matrix for another example PT symmetric directional coupler having another difference in the refractive index between the gain and loss waveguides.
Figure 5B:
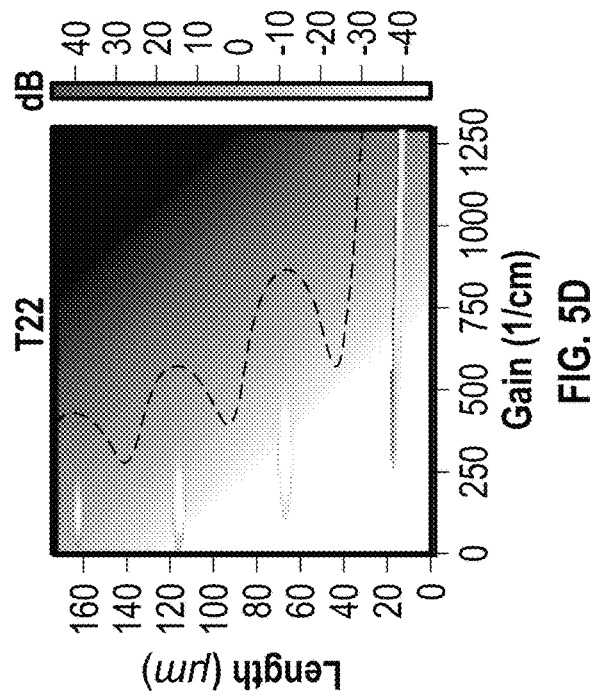
Figure 5C:
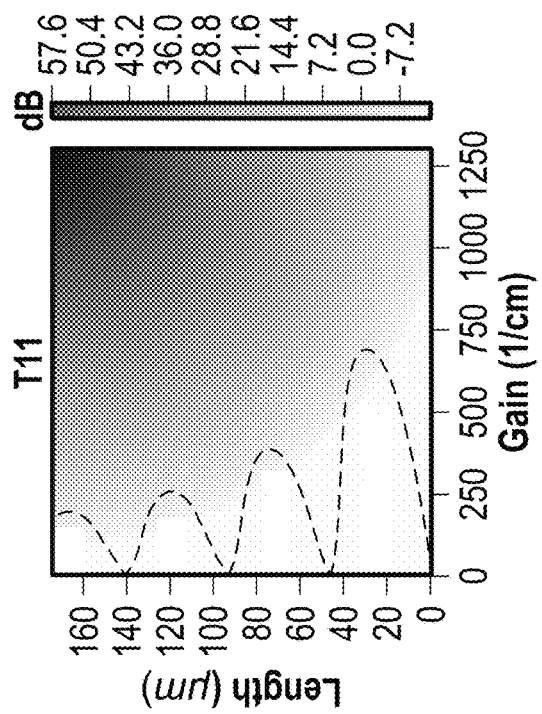
Figure 5D:
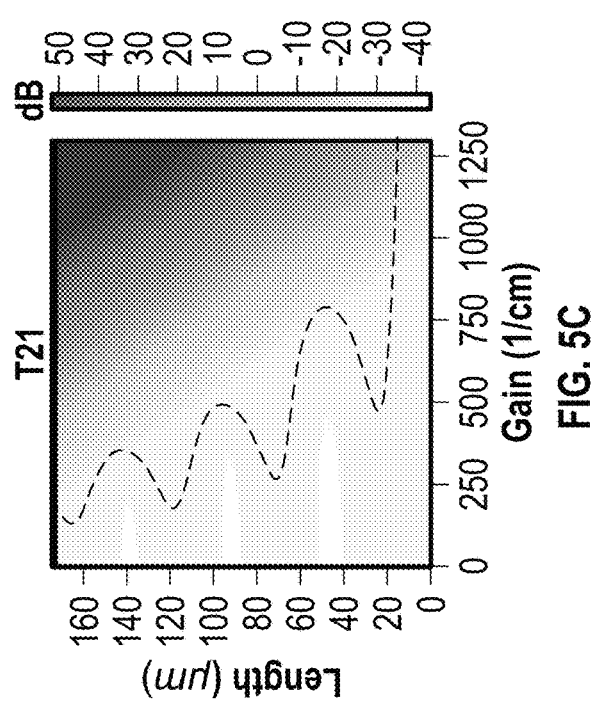

4B, taken along a single length. FIGS. 5A-5D illustrate example heat maps depicting transmission intensity matrix ($T^{ij}$) for another example PT symmetric directional coupler, where the difference in the refractive index between the gain and loss waveguides is $10e^{-3}$. The transmission intensity matrices ($T^{ij}$) are depicted as heat maps where the color in each heat map corresponds to a transmission intensity value in dB as shown in the legend, plotted as length L as a function of gain. The dotted line in each heat map corresponds to a transmission intensity of 0 dB. FIGS. 4A and 5A correspond to the transmission intensity matrix $T^{11}$; FIGS. 4B and 5B correspond to the transmission intensity matrix $T^{12}$; FIGS. 4C and 5C correspond to the transmission intensity matrix $T^{21}$; FIGS. 4C and 5C correspond to the transmission intensity matrix $T^{22}$. The transmission intensity matrix of each heat map was calculated with the coupling length (L a) as 25 μm, light wavelength (λ) as 1.31 μm, and loss introduced as $-10$ cm$^{-1}$.

FIGS. 4A-4D illustrate that optical switching can be achieved regardless of adjusting the actual length of the gain to loss section by adjusting the gain to loss ratio. For example, as shown in FIGS. 4A-4D, as gain is increased, with loss held constant at $-10$ cm$^{-1}$, the transmitted intensity increases regardless of the adjusting length. However, when the difference in refractive index becomes too large (for example, $10e^{-3}$), the power extinction degrades, as shown in FIGS. 5A-5D. Accordingly, as alluded to above, as the difference in refractive index between the first and second waveguides becomes larger, the PT symmetry degrades thereby hindering the performance of the directional coupler.

Accordingly, implementations of the technology disclosed herein provide for directional couplers that can be tuned to obtain PT symmetry. For example, gain and/or loss introduced into waveguides may be modulated so to tune the gain to loss ratio within the vicinity of the exceptional point for PT symmetry. For example, a first mesa comprising a first optically active region can be provided in relation to a first waveguide. A voltage bias may be applied to the first mesa to induce an optical gain or loss in the first waveguide based on changes in carrier concentrations within the first mesa. By controlling the bias applied the first mesa, the gain or loss may be varied to optimize the gain to loss ratio with respect to the exceptional point. Whether gain or loss is induced may be based on the polarity of the bias (e.g., forward or reverse bias). Additionally or alternatively, a second mesa comprising a second optically active region can be provided in relation to a second waveguide. A separate voltage bias may be applied to the second mesa to induce an optical loss or gain in the second waveguide. As such, the optical loss induced the second waveguide can be varied by controlling the bias applied to the second mesa. In an example including both the first and second mesa, control of bias applied to each provides for modulating the optical gain and loss in each respective waveguide separately and fine tuning the gain to loss ratio.

Figure 6B:
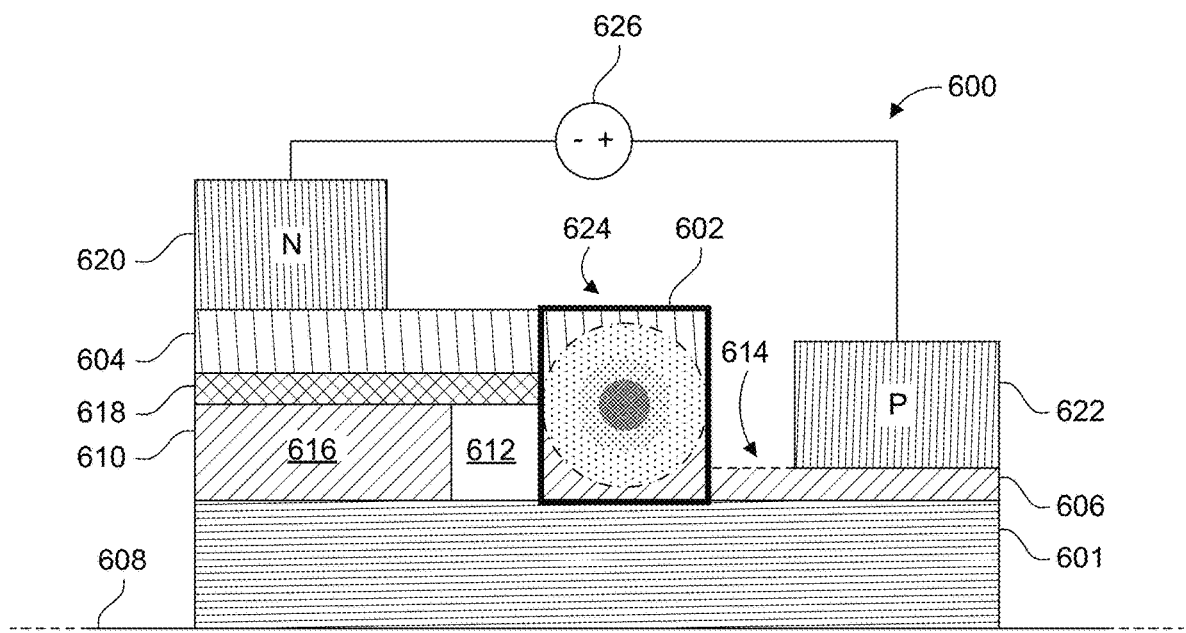

In various implementations, either alone or in combination with tuning the gain to loss ratio, phase modulation may be utilized to tune the refractive index between the waveguides. For example, according to various examples of the disclosed technology, a hybrid MOSCAP may be provided in relation a waveguide, which may be biased to modulate the phase of optical mode of a corresponding waveguide. The phase modulation corresponds to an effective change in the refractive index of the waveguide. Thus, the effective refractive index of the waveguide can be modulated by applying a voltage bias to the hybrid MOSCAP, thereby providing for tuning of a refractive index difference between the waveguides. For example, the voltage bias applied to the MOSCAP provides for phase tuning of the optical mode via plasma dispersion or carrier accumulation effects that induce alterations to the phase. By tuning the refractive index difference, examples provided herein can maintain a power extinction point to achieve PT symmetry and realize efficient optical switching. That is, for lengths that are smaller than those possible with traditional directional couplers, optical switching that is dependent only on the gain to loss ratio. For example, FIGS. 6A and 6B illustrate an example hybrid MOS optical modulator 600 that may be implemented in the technology disclosed herein. FIG. 6A is a top-down view of the optical modulator 600 and FIG. 6B is a cross-sectional view of the optical modulator 600 taken along a line A-A' shown in FIG. 6A.

The optical modulator 600 includes an optical waveguide 602, a cathode 604 comprising a first material and formed in the optical waveguide 602, and an anode 606 comprising a second material that is different from the first material and formed in the optical waveguide 602. The anode adjoins the cathode. A capacitor is defined between the anode and the cathode.

In some examples, a substrate 601 comprises oxide grown on an underlying layer 608. A silicon layer 610 is formed on the substrate 601. A trench 612 separates the optical modulator 600 into two portions 614 and 616. The first portion 614 comprises the anode 606. The optical waveguide 602 is formed in the anode 606. The cathode 604 is integrated to the second portion 616. In various embodiments, the cathode 604 comprises a layer of Group III-V material as the first material. A MOS capacitor (MOSCAP) 624 is defined between the cathode 604 and the anode 606.

A dielectric 618 is formed between the cathode 604 and the anode 606. The dielectric 618 may be an electrically insulating material formed between the cathode 604 and anode 606 of the MOSCAP 624, and the polarization of the dielectric 618, by an applied electric field, may increase the surface charge of the MOSCAP 624 for a given electric field strength. The dielectric 618 can be native oxides of the cathode or the anode or both, or can be external dielectric materials such as high-k dielectrics or polymers which can be formed by deposition, oxidation, wafer bonding or other dielectric coating methods.

The cathode 604 may comprise negatively-doped Group III-V material and the anode 606 may comprise positively-doped silicon, other Group IV material, or any semiconductor material capable of electrical conductivity and optical transparency. A cathode electrode 620 is disposed on the cathode 604 and an anode electrode 622 is disposed on the anode 606. When a voltage is applied between the electrodes, carrier accumulation, depletion or inversion can occur around dielectric 618. Due to the capacitor region overlapping with the optical waveguide, carrier concentration change may lead to changes in waveguide modal refractive index and propagation loss. By biasing the voltage applied between the electrodes, the refractive index may be modulated accordingly, thereby inducing optical intensity modulation, phase shift modulation, and attenuation.

Light may be input the into the optical modulator 600 via waveguide 602. As the light propagates through the waveguide 602, it can be modulated, attenuated, and phase shifted based on changes in the waveguide modal refractive index induced by biasing of the MOSCAP 624. The modulated light is then output from the optical modulator 600. The waveguide modal refractive index can be changed, for example, through carrier accumulation, depletion or inversion induced when a voltage is applied to the electrodes.

For example, FIG. 6B includes a DC power source 626. The DC power source 626 acts as a signal source and has a negative terminal connected to the cathode electrode 620 and a positive terminal connected the anode electrode 622. This results in a migration of negative charges from the cathode 604 toward a side of the optical waveguide 602 adjacent to the cathode 604, and migration of positive charges ("holes") from the anode 606 to an opposite side of the waveguide 602 (also referred to herein as accumulation mode). In other examples the polarity of the DC power source 626 may be reversed. Reversing the polarity of the DC power source 626 causes a migration of negative charges from the waveguide 602 toward cathode electrode 620, and migration of holes from the waveguide 602 toward anode electrode 622 (also referred to herein as depletion mode).

The MOSCAP 624 forms at the boundary between the Group III-V material of the cathode 604 and the underlying capacitor portion of the intrinsic silicon or other Group IV material of the anode 606. A thin layer of silicon and Group III-V oxides (e.g., dielectric 618) forms naturally at this boundary and serves as a dielectric for the capacitor. In some examples, this thin layer has a thickness on a nanoscale, for example, a few nanometers thick. In some examples, steps need not be taken to encourage the formation of dielectric 618. In other examples, the formation of dielectric 618 may be stimulated, for example by elevating the temperature, exposing the materials to an oxygen-rich atmosphere, or other suitable technique.

In some examples, Group III-V material may comprise gallium arsenide (GaAS). In other examples, Group III-V material may comprise indium phosphide (InP) or other compounds of indium, gallium, phosphorus, and arsenic. More generally, the cathode and anode are formed of different materials which may comprise II-VI semiconductor compounds or other materials. Metals may be used.

In some examples, Group III-V oxides that form the dielectric 618 may comprise aluminum oxide ($Al_2O_3$), hafnium oxide ($HfO_2$), or vanadium dioxide ($VO_2$). In other examples, Group III-V oxides may include, but are not limited to, the compounds shown in Table 1 below (note that Si has a gap of 1.1 eV):

TABLE 1

|  | K | Gap (eV) | CB offset (eV) |
|---|---|---|---|
| $SiO_2$ | 3.9 | 9 | 3.2 |
| $Si_3N_4$ | 7 | 5.3 | 2.4 |
| $Al_2O_3$ | 9 | 8.8 | 2.8 (not ALD) |
| $Ta_2O_5$ | 22 | 4.4 | 0.35 |
| $TiO_2$ | 80 | 3.5 | 0 |
| $SrTiO_3$ | 2000 | 3.2 | 0 |
| $ZrO_2$ | 25 | 5.8 | 1.5 |
| $HfO_2$ | 25 | 5.8 | 1.4 |
| $HfSiO_4$ | 11 | 6.5 | 1.8 |
| $La_2SO_3$ | 30 | 6 | 2.3 |
| $Y_2O_3$ | 15 | 6 | 2.3 |
| a-$LaAlO_3$ | 30 | 5.6 | 1.8 |

As discussed previously, the MOSCAP 624 is formed inside the optical waveguide 602 so that charge carriers that accumulate/deplete on either side of the capacitor dielectric have the effect of changing the index of refraction of the optical waveguide and changing waveguide loss (e.g., loss or attenuation of propagated signal power in the waveform).

The MOSCAP 624 can operate in accumulation, depletion or inversion mode (e.g., accumulation of electrons at the dielectric layer in addition to presence of holes). As discussed above, a DC voltage can be applied between an anode 606 and cathode 604, causing a thin charge layer to accumulate, deplete, or invert on both sides of the dielectric layer 618. The resulting change in free carrier density causes a plasma or carrier accumulation effect, which causes a change in phase of the optical mode of the optical waveguide 602. This change in phase is manifested as a change in the effective refractive index of the optical mode ($\Delta n_{eff}$). The amount of change or modulation in the effective refractive index ($\Delta n_{eff}$) and associated change in optical losses ($\Delta \alpha$) can be described with as follows:

$$\Delta n_{eff} = \frac{-q^2 \lambda_0^2}{8\pi^2 c^2 n \varepsilon_0}\left(\frac{\Delta N_e}{m_{ce}^*} + \frac{\Delta N_h}{m_{ch}^*}\right) \qquad \text{Eq. 6}$$

$$\Delta \alpha = \frac{-q^3 \lambda_0^2}{4\pi^2 c^3 n \varepsilon_0}\left(\frac{\Delta N_e}{m_{ce}^{*2} \mu_e} + \frac{\Delta N_h}{m_{ch}^{*2} \mu_h}\right) \qquad \text{Eq. 7}$$

Where q is electrical charge applied to the cathode 604 and the anode 606, c is the speed of light in vacuum, $\varepsilon_0$ is the permittivity of free space, n is the material refractive index, $\Delta N$ represents a change in carrier density such that $\Delta N_e$ represents the change in carrier density in terms of electrons that $\Delta N_h$ represents the change in carrier density in terms of holes, m* represents the relative effective mass of electrons ($m^*_{ce}$) and holes ($m^*_{ch}$), $\mu_h$ represents the hole mobility, $\mu_e$ represents the electron mobility, and $\lambda_0$ is the free space wavelength.

An optical phase shift ($\Delta \varphi$) at the end of the capacitor depends on the magnitude of the voltage-induced $\Delta n_{eff}$, the device length L, and the optical wavelength $\lambda$. In this example, the optical phase shift can be calculated as $\Delta \varphi = 2\pi \Delta n_{eff} L / \lambda$. Thus, the optical phase of the light within optical waveguide 602 may be shifted based on the voltage-induced $\Delta n_{eff}$, and vice versa. In various examples, the waveguide loss in silicon and Group III-V material may also change simultaneously as carrier density changes, and control of the change in the waveguide loss can be used as an optical attenuator. For example, changes in waveguide loss may be controlled based on the change in carrier density, which may impart attenuation of the waveguide losses. The attenuated waveguides losses can be used to modulate a signal.

Figure 7A:
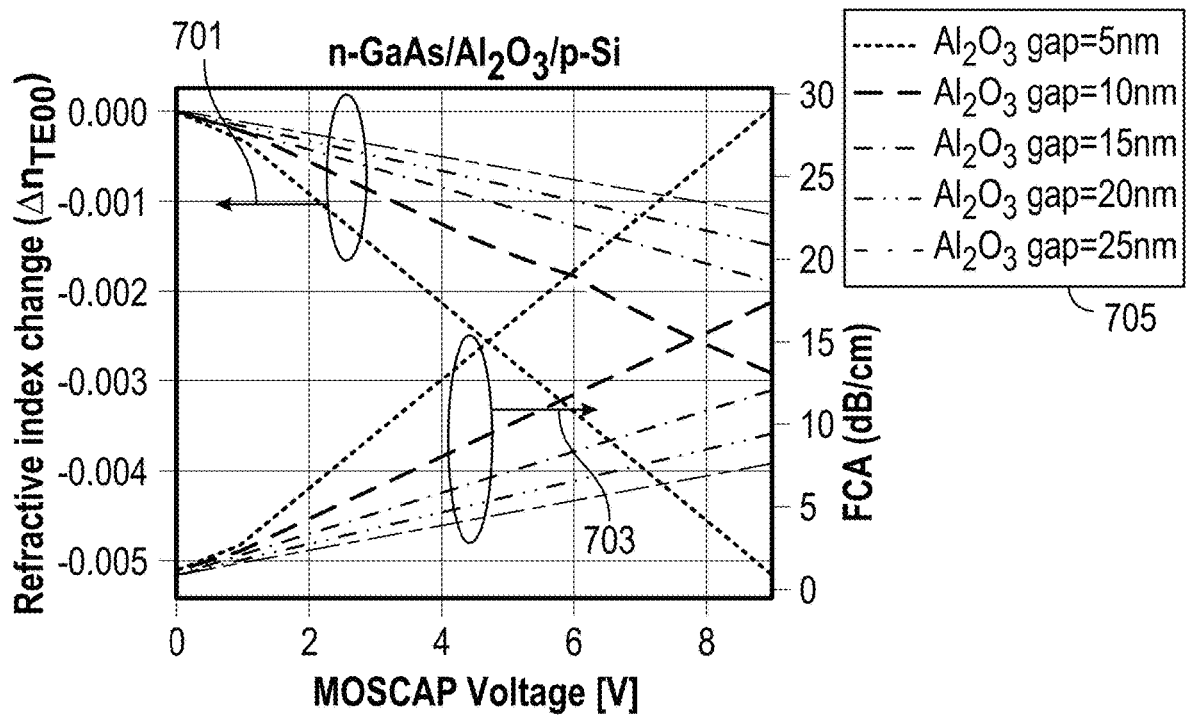
FIGS. 7A and 7B show simulated relationships between voltage applied to the optical modulator of FIGS. 6A and 6B for various dielectric thicknesses plotted against a change in modal refractive index and change in FCA.
Figure 7B:
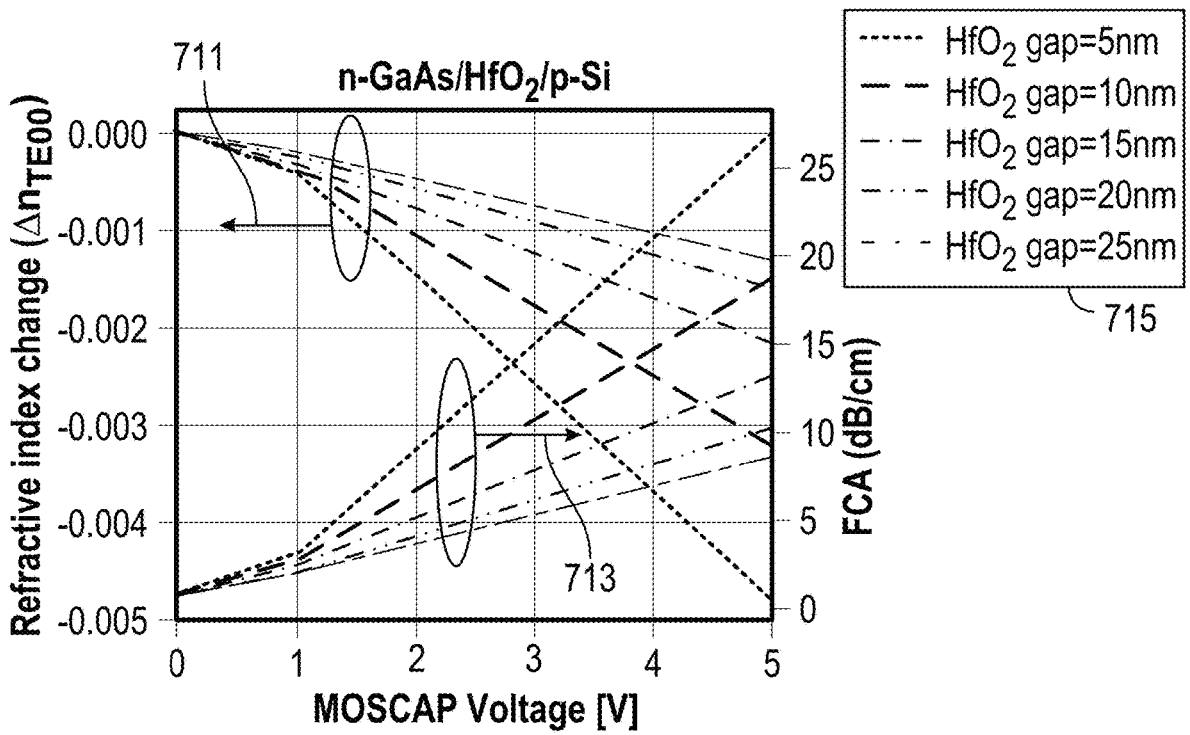

FIGS. 7A and 7B show simulated relationships between voltage applied to the optical modulator 600 of FIGS. 6A and 6B for various gap thicknesses plotted against the change in refractive index ($\Delta n_{eff}$) of the optical mode of the waveguide (left axis) and change in free carrier absorption (FCA) losses (right axis). In the simulations used to create FIGS. 7A and 7B, the cathode 604 was formed of n-doped gallium arsenide (GaAS) doped to $3\times10^{18}$ cm$^{-2}$ and the anode 606 was formed of p-doped silicon doped to $5\times10^{16}$ cm$^{-2}$. The dielectric 618 of the simulation of FIG. 7A was formed of aluminum oxide ($Al_2O_3$) and the dielectric 618 of the simulation of FIG. 7B was formed of hafnium oxide ($HfO_2$). The thickness of the gap between the anode 606 and cathode 604 (e.g., the thickness of the dielectric 618 formed therebetween) in each simulation was varied from 5 nm to 25 nm at increments of 5 nm, as shown in legend 705 of FIG. 7A and legend 715 of FIG. 7B. These are merely example configurations used to generate the simulated data displayed in FIGS. 7A and 7B. Other configurations are contemplated within the implementations disclosed herein.

As indicated by pointer 701 in FIG. 7A and pointer 711 in FIG. 7B, solid lines show the change in refractive index ($\Delta n_{eff}$) for each gap thickness as a function of voltage bias applied to the optical modulator 600. Similarly, pointers 703 and 713 indicate that the dashed lines show the change in FCA loss for each gap thickness as a function of voltage bias applied to the optical modulator 600. Thus, as shown in FIGS. 7A and 7B, the amount of refractive index change depends on the type of dielectric 618 and gap thickness, and more particularly, as the gap thickness increases the change in refractive index decreases. Additionally, FIGS. 7A and 7B depict that the amount of FCA loss depends on the type of dielectric 618 and gap thickness, and more particularly, as the gap thickness increases the FCA loss decreases.

Figure 8A:
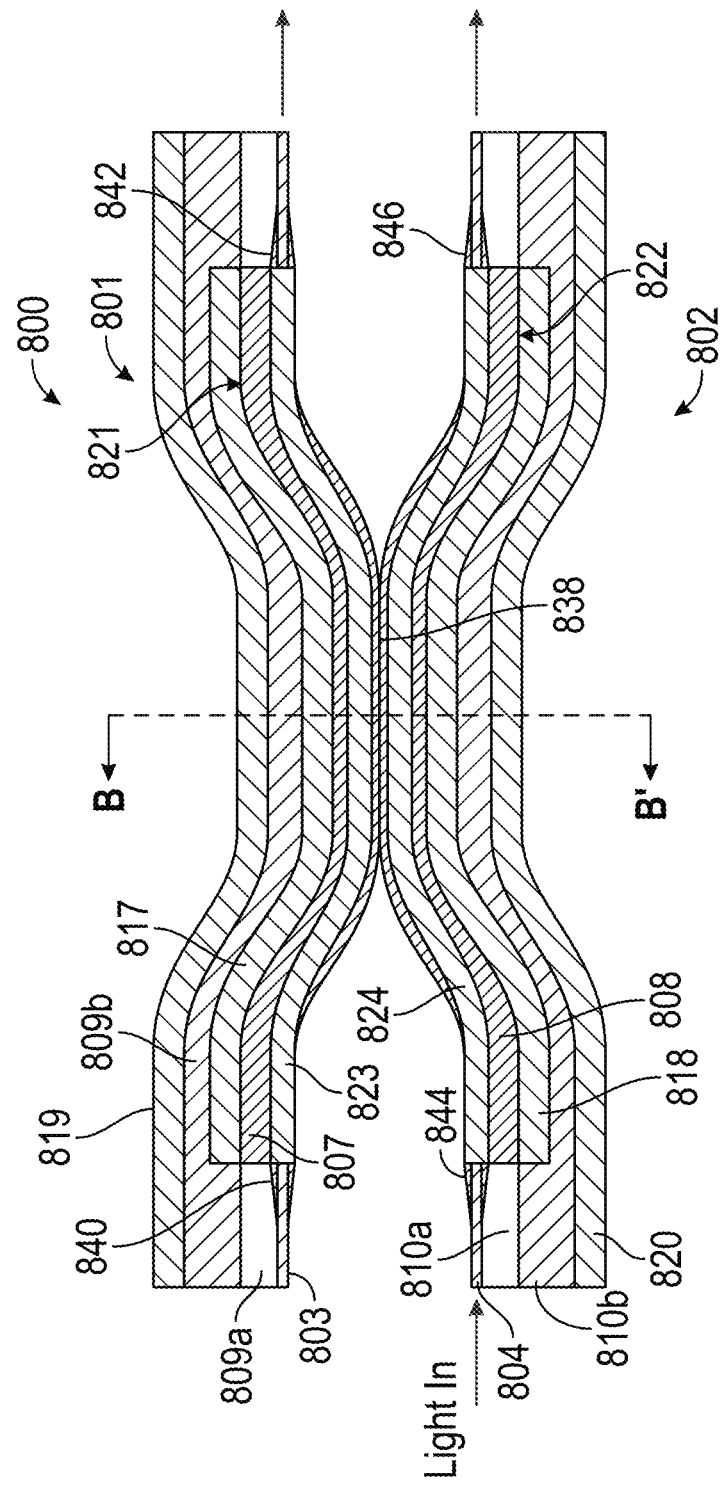
FIG. 8A illustrates a top-down view of an example directional coupler according to implementations disclosed herein.
Figure 8B:
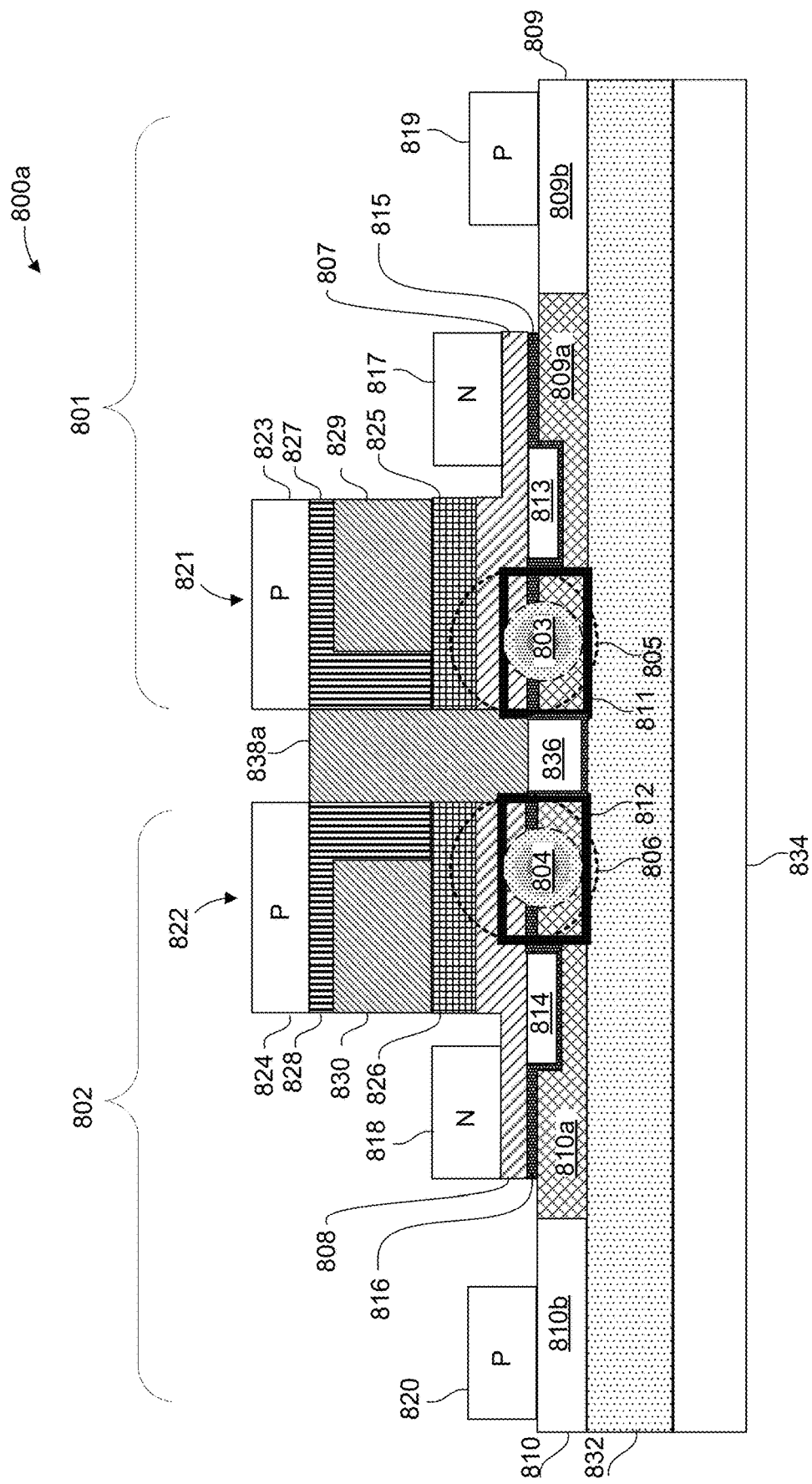
FIG. 8B illustrates a cross-sectional view of an example directional coupler taken along the line B-B' of FIG. 8A.
Figure 8C:
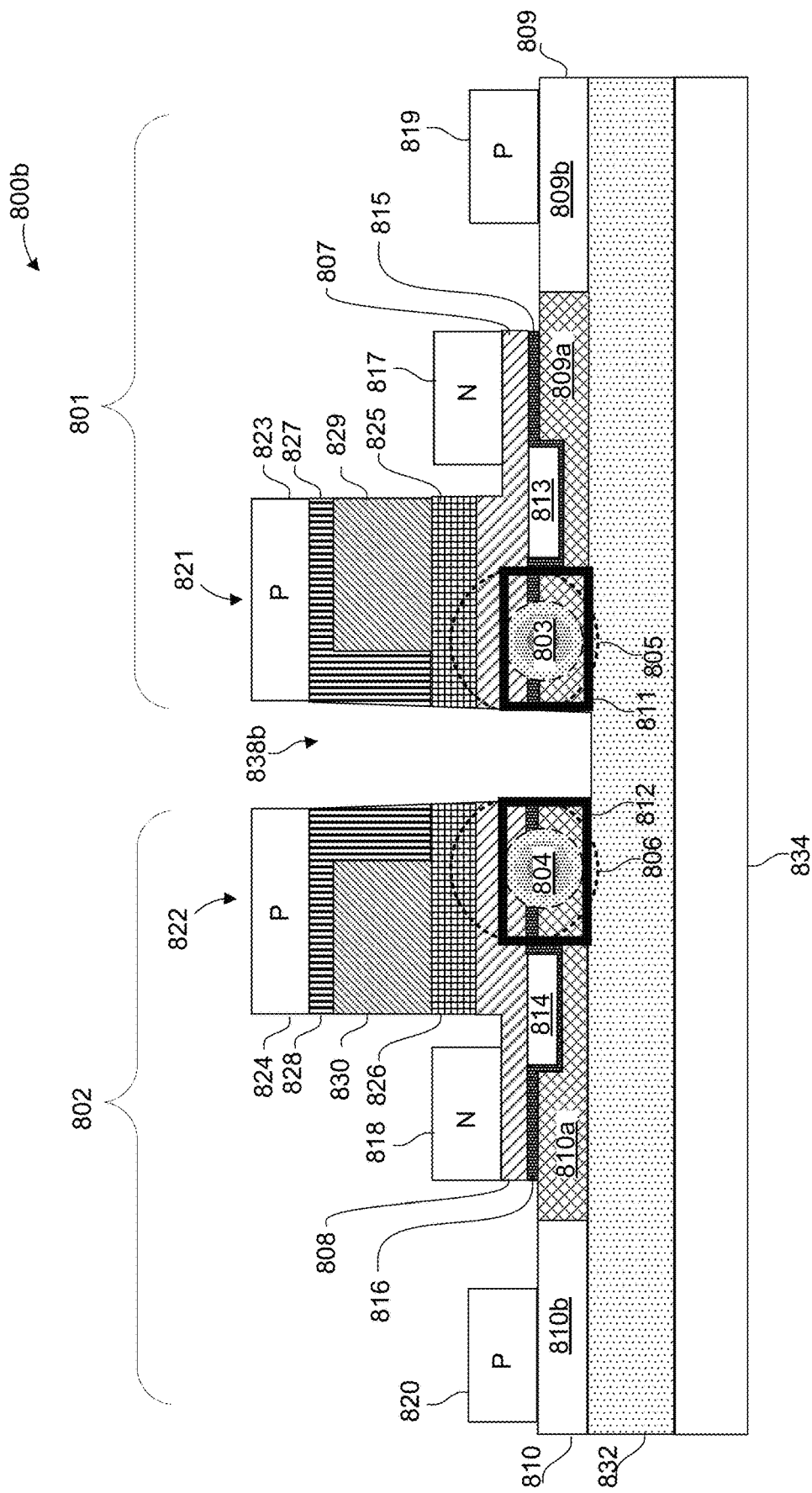
FIG. 8C illustrates a cross-sectional view of another example directional coupler taken along the line B-B' of FIG. 8A.

FIGS. 8A-8C illustrate examples of directional couplers according to implementations disclosed herein. FIG. 8A illustrates a top-down view of the directional coupler 800. FIG. 8B illustrates a cross-sectional view of an example directional coupler 800a taken along the line B-B' within a coupling region of FIG. 8A. FIG. 8C illustrates a cross-sectional view of another example directional coupler 800b taken along the line B-B' of FIG. 8A. The directional couplers 800a and 800b of FIGS. 8B and 8C are substantially the same as the directional coupler 800, except that directional coupler 800a includes an isolation region 838 implemented as an ion region 838a and direction coupler 800b includes an isolation region 838 implemented as a gap 838b, such as an air gap. Accordingly, the following disclosure applies equally to each of FIGS. 8A-8C, unless otherwise noted herein.

In various examples, the directional coupler 800 includes a buried oxide (BOX) layer 832 grown on a substrate 834, for example, such as a silicon dioxide layer. The directional coupler 800 also comprises a first section 801 (also referred to herein as first leg) and a second section 802 (also referred to herein as second leg) formed on the BOX layer 832. The first section 810 is spaced apart from the second section 820 via a gap 836 (e.g., an air gap). The first section 801 comprises a first optical waveguide 803 and the second section 802 comprises a second optical waveguide 804. Each optical waveguide 803 and 804 has a respective one or more optical modes, and an example of the optical energy of the one or more modes is shown as regions 805 and 806, respectively. In various implementations, the first and second waveguides 803 and 804 are single mode waveguides.

The first optical waveguide 803 and second optical waveguide 804 may be similar to the first waveguide 110 and second waveguide 120 of FIG. 1, respectively. For example, the first optical waveguide 803 includes an input port and an output port and the second optical waveguide 804 includes an input port and an output port. Light input into one waveguide may be tapped off into the other waveguide via the gap 836, as described above in connection with FIGS. 1-4C. In the illustrative example shown in FIG. 8A, light is input into an input port of the second optical waveguide 804 and is output from output ports of both optical waveguides 803 and 804. Light input into one waveguide (e.g., one of optical waveguides 803 and/or 804) can be transferred to the other waveguide (e.g., one of optical waveguides 804 and/or 803) across the gap 836 and BOX layer 832 and output from directional coupler 800 for use downstream. The BOX layer 832 may be provided to confine the optical mode in a vertical direction (e.g., into the layers provided on the BOX layer 832). Control of the width of the gap 836 may alter the coupling ratio between the first and second optical waveguides 803 and 804 (e.g., a larger width results in a smaller coupling ratio).

The first section 801 also comprises a first mesa 821 and a first MOSCAP 811. The first mesa 821 is provided for introducing optical gain or optical loss to the first optical waveguide 803 based on applying a voltage bias between contact electrode 823 (referred to herein as electrode 823) and contact electrode 817 (referred to herein as electrode 817). Whether optical gain or optical loss is introduced is based on the polarity of the bias, for example, a forward bias may be used to introduce gain and a reverse bias may be used to introduce loss. The first MOSCAP 811 is configured to change the refractive index of the first optical waveguide 803 based on a voltage bias between contact electrode 819 (referred to herein as electrode 819) and electrode 817. For example, as noted above, a voltage bias applied to MOSCAP 811 provides for phase tuning via plasma dispersion or carrier accumulation effects depending on the bias polarity. A carrier accumulation effect, via a positive or forward voltage bias, will alter the phase and decrease the effective refractive index of the first waveguide 803, whereas a plasma dispersion effect, via a negative or reverse voltage bias, will increase the effective refractive index. Further details on the components of the first mesa 821 and first MOSCAP 811 are provided below.

The second section 802 also comprises a second mesa 822 and a second MOSCAP 812. The second mesa 822 is provided for introducing optical loss or optical gain to the second optical waveguide 804 based on applying a voltage bias (e.g., reverse or forward bias) between contact electrode 824 (referred to herein as electrode 824) and contact electrode 818 (referred to herein as electrode 818). Similar to the first MOSCAP 811, the second MOSCAP 812 configured to change the refractive index of the second optical waveguide 804 based on a voltage bias between contact electrode 820 (referred to herein as electrode 820) and electrode 818. Further details on the components of the second mesa 822 and second MOSCAP 812 are provided below.

Accordingly, the directional coupler 800 provides for modulating the gain and/or loss simultaneously with tuning a refractive index difference between the first and second optical waveguides 803 and 804, so as to optimize the gain to loss ratio and power extinction to obtain a PT symmetric directional coupler. For example, one or more voltage bias can be applied to the first mesa 821 and/or the second mesa 821 for individually tunning the optical gain and/or optical loss, thereby optimizing the gain to loss ratio with respect to the exceptional point. For example, a voltage bias may be applied to the first mesa 821 to modulate the gain or loss depending on the polarity of the bias (e.g., forward or reverse bias). Separately, either simultaneously, subsequently or prior to biasing the first mesa 821, a voltage bias may be applied to the second mesa 822 to modulate the loss or gain depending on the polarity of the bias (e.g., reverse or forward bias).

In some examples, coinciding with the bias of the first and/or second mesa 821 and 822, voltage bias can be applied to the first and/or second MOSCAPs 811 and 812 for tunning a refractive index difference between the optical waveguide 803 and 804. For example, applying a voltage to either of the first or second MOSCAPs 811 and 822 causes a change in the refractive index of the respective optical waveguide 803 and 804 (e.g., according to Eq. 6 and 7 above). The refractive index change in either of or both of the first and second optical waveguides 803 and 804 can be used to tune the refractive index difference to maximize the power extinction while the gain to loss ratio optimized.

While the examples provided herein with reference to FIGS. 8A-8C provide for both gain and loss tuning, the technology disclosed herein is not so limited. For example, instead of including both the first and second mesa 821 and 822, implementations maybe be provided comprising one of mesa 821 and 822. For example, in one implementation, first mesa 821 may provide and second mesa 822 not included. Thus, as described above, first mesa 821 may be biased to modulate the gain while loss is held constant. As another example, second mesa 822 may be provided and first mesa 821 not included. In this case, first mesa 821 may be biased to modulate the loss while gain is held constant.

Similarly, while the example provided herein with reference to FIGS. 8A and 8B provide for two MOSCAPs for independently modulating the index of refraction of each waveguide, the technology disclosed herein is not so limited. For example, instead of including both the first and second MOSCAPs 811 and 812, implementations maybe be provided comprising one of MOSCAP 811 and 812. For example, in one implementation, first MOSCAP 811 may provide and second MOSCAP 812 not included. Thus, as described above, first MOSCAP 811 may be biased to modulate the index of refraction of first optical waveguide 803 while that of second optical waveguide 804 is held constant. As another example, second MOSCAP 812 may be provided and first MOSCAP 811 not included. In this case, second MOSCAP 812 may be biased to modulate the refractive index of second optical waveguide 804 while that of first optical waveguide 803 is held constant.

Turning now to first section 801 in more detail, the first section 801 includes a cathode 807 comprising a first material and a portion of which is formed in the first optical waveguide 803 and an anode 809 comprising a second material that is dissimilar from the first material and also formed in the first optical waveguide 803. In some implementations, the cathode 807 tapers down to the waveguide 803 at the input and output of the waveguide to enable optical transition from waveguide to the cathode 807, as shown as tapers 840 and 842 in FIG. 8A. The anode 809 adjoins the cathode 807 within the first optical waveguide 803. A first capacitor 811 is defined between the anode 809 and the cathode 807. In various implementations, the cathode 807 comprises a step cross-sectional shape to reduce the presence of the first material in areas that are not necessary for carrying out the functions and operations of the first section 801.

The anode 809 is formed on the BOX layer 832 and the cathode 807 is formed above the anode 809 opposite the BOX layer 832. The anode 809 comprises a trench 813 formed therein and the cathode 807 spans the trench 813. The trench 813 may be provided to confine the optical mode in the horizontal direction. In various embodiments, the cathode 807 comprises a layer of Group III-V material as the first material, such as indium phosphide (InP), gallium arsenide (GaAs) or other compounds of indium, gallium, phosphorus, and arsenic. The cathode 807 may be formed by, for example but not limited to, deposition, wafer bonding, monolithic growth, or other fabrication techniques. The anode 809 may comprise silicon or another Group IV material as the second material, for example, germanium, silicon carbide, silicon germanium, and so on. The capacitor 811 may be the first MOSCAP defined between the cathode 807 and the anode 809.

A dielectric 815 (also referred to herein as an interfacial layer) is formed between the cathode 807 and the anode 809 and formed in the first optical waveguide 803. The dielectric 815 can be native oxides of the cathode or the anode or both, or external dielectric materials such as high-k dielectrics or polymers which can be formed by deposition, oxidation, wafer bonding or other dielectric coating methods. For example, the dielectric 815 may be similar to dielectric 618 of FIGS. 6A and 6B and may comprise aluminum oxide ($Al_2O_3$), hafnium oxide ($HfO_2$), vanadium dioxide ($VO_2$), or any of the compounds listed in Table 1.

The first MOSCAP 811 forms at the boundary between the first material of the cathode 807 and the underlying first optical waveguide 803 of semiconductor material (e.g., silicon or other Group IV material). A thin layer of silicon and III-V oxides forms at this boundary and serves as a dielectric for the capacitor (e.g., dielectric 815). In some examples, the dielectric layer 815 may have a nanoscale thickness, for example, the dielectric layer 815 may be a few nanometers thick. For example, as shown in FIGS. 7A-7B, the thickness of dielectric layer 815 may be between 5 nm and 25 nm. As described in connection with FIGS. 7A and 7B, a smaller thickness translates to greater changes in effective refractive index for a smaller voltage bias applied; however, a smaller thickness also translates to greater FCA loss. Thus, some implementations utilize dielectric having a small thickness (e.g., on the order of 5 nm) and account for the FCA loss through gain/loss modulation through the first mesa 821. In some examples, steps need not be taken to encourage the formation of dielectric 815. In other examples, the formation of dielectric 815 may be stimulated, for example by elevating the temperature, exposing the materials to an oxygen-rich atmosphere, or other suitable technique.

Electrode 817 is disposed on the cathode 807 and electrode 819 is disposed on the anode 809. When a voltage bias is applied to electrodes 817 and 819, carrier accumulation or depletion can occur around dielectric 815 based on the polarity of the voltage bias (e.g., forward or reverse bias, respectively), as described in greater detail below, which causes carrier or plasma dispersion effects. Due to the capacitor region overlapping with the optical waveguide, carrier concentration change may lead to changes in optical mode phase, effective refractive index and propagation loss, for example, as explained in connection with Eq. 6 and 7. By biasing the voltage applied between the electrodes 817 and 819, the refractive index may be modulated accordingly. For example, a voltage bias (e.g., a DC voltage bias) can be applied between anode 809 and cathode 807, causing a thin charge layer to accumulate or deplete on both sides of the dielectric layer 815. The resulting change in free carrier density causes a plasma or carrier accumulation effect, which causes a change in phase of the optical mode of the first optical waveguide 803. This change in phase is manifested as a change in the effective refractive index of the optical mode ($\Delta n_{eff}$). The amount of change or modulation in the effective refractive index ($\Delta n_{eff}$) and associated change in optical losses ($\Delta \alpha$) can be described with as set forth in Eqs. 6 and 7 above.

The cathode 807 may comprise negatively-doped material (e.g., a n-doped semiconductor layer comprising silicon or other Group IV) and the anode 809 may comprise a first portion 809a comprising positively-doped material (e.g., a p-doped semiconductor layer). To enhance the change in effective refractive index and optical phase shift induced in the first optical waveguide 803, the anode 809 comprises a second portion 809b formed on the BOX layer 832 adjacent to the first portion 809a opposite the first optical waveguide 803. The electrode 819 may be disposed on the second portion 809b.

In various implementations, the cathode 807 comprises a heavy negatively-doped material, the first portion 809a comprise a positively-doped material, and the second portion comprises a heavily positively doped material. As used herein, heavily doped and lightly doped refer to doping concentrations in relation to a doped material. That is, a heavily doped material comprises a doping concentration (e.g., carrier concertation, either holes or electrons, dependent on whether the doping is p-type or n-type, respectively) that is greater than a doped material, while a lightly doped material comprises a doping concentration that is less than that of a doped material. In various examples disclosed herein, lightly doped may refer to a case where dopant concentration is on the order of one atom per 100 million atoms of material. Heavily doped may refer to a case of much higher dopant concentration, such as on the order of one atom per ten thousand atoms of material. In the illustrative example, the cathode 807 may comprise a Group III-V material having n-type doping concentration of approximately $1e^{18}$ cm$^{-3}$ or more. In another example, the cathode 807 may be doped to between approximately $1e^{18}$ cm$^{-3}$ and approximately $1e^{19}$ cm$^{-3}$. In an example, the first portion 809a may comprise silicon or other Group IV material having p-type doping concentration of approximately $1e^{16}$ cm$^{-3}$ and approximately $5e^{18}$ cm$^{-3}$. In some examples, the second portion 809b may comprise silicon or other Group IV material heavily positively-doped, for example, to greater than approximately $5e^{18}$ cm$^{-3}$.

The first section 801 also includes the first mesa 821, as described above, configured to induce optical gain and/or optical loss. For example, optical gain may be achieved by light-emission generated within the first mesa 821, which produces light that can be absorbed in the optical energy region 805 and injected into the first optical waveguide 803. Light injected into the optical first optical waveguide 803 functions as optical gain induced into the first optical waveguide 803. The light-emission may be achieved, for example, by a light-emitting diode, laser diode, and the like.

Alternatively, optical loss may be achieved by light-absorption within the first mesa 821 by absorbing optical energy from optical energy region 805, thereby absorbing light propagating in first optical waveguide 803. A reverse bias on an active region causes electron-hole band bending which results in absorption. Light-absorption from the second optical waveguide 804 corresponds to propagation loss induced in the second optical waveguide 804. Light-absorption may be achieved, for example, by a biasing an optically active medium.

To achieve modulation of optical gain or optical loss, the first mesa 821 includes an optically active region 825 (or laser gain material in the case of a laser diode) formed on the cathode 807. The optically active region 825 may comprise, for example, quantum dot (QD), quantum wells (QW), quantum-dash (QD) structures, or any structure that can create carrier population inversion for optical gain as an optical gain medium. A semiconductor layer 827 is formed on the optically active region 825. The semiconductor layer 827 may comprise positively-doped Group III-V material, such as GaAs or the like. In one illustrative example, semiconductor layer 827 may be doped with p-type dopants to a concentration of greater than approximately $5e^{18}$ cm$^{-3}$.

Electrode 823 may be formed on the semiconductor layer 827 opposite the optically active region 825. In one example, in a case where a forward voltage bias is applied between the electrodes 823 and 817, carrier concentration change through accumulation leads to stimulated emission in the optically active material 825, thereby generating light. Generated light traverses the layers and is absorbed in the optical energy region 805 and is received at and propagates within the first optical waveguide 803. In another example, responsive to a reverse voltage bias applied between the electrodes 823 and 817, electron-hole band bending occurs which causes absorption, thereby absorbing light propagating in the first optical waveguide 803 to induce propagation loss.

Accordingly, by biasing the voltage applied between the electrodes 823 and 817, optical gain or loss can be added to the first optical waveguide 803 via first mesa 821. The amount of optical gain or loss may be modulated based on changing the magnitude of the voltage bias applied to the first mesa 821, which may be tuned in view of the loss or gain in the second section 802 to achieve the exceptional point. Additionally, the optical gain to lose ratio may be tuned simultaneously with tuning the refractive index difference between the first and second sections 801 and 802 by controlling the bias applied to electrodes 823 and 817 and the bias applied to electrode 819 and 817. Thus, while a change in gain may also induce a change in refractive index (and vice versa), the refractive index and gain to loss ratio can both be tuned to ensure that power extinction maintained and that the gain to loss ratio is at or exceeds the exception point.

The first mesa 821 also comprises ion region 829 within the semiconductor layer 827. The ion region 829 provides for efficient electrical carrier confinement within the semiconductor layer 827. For example, in the case of induced optical gain, the ion region 829 confines carrier migration to a region that overlaps vertically with the first optical waveguide 803. Thus, the ion region 829 ensures optical gain is generated toward the first optical waveguide 803, and in a horizontal direction such that the optical gain would not be provided to the first optical waveguide 803. The ion region 829 may be formed through an ion implementation process to implant ions into a portion the semiconductor layer 827. The ions may be hydrogen ions (H$^+$) or any other ions as desired for a given application.

Turning now to second section 802 in more detail. The second section 802 may be substantially similar to the first section 801, having a mirrored structure. For example, second section 802 includes a cathode 808 comprising a first material and a portion of which is formed in the second optical waveguide 804. The second section 802 also includes an anode 810 comprising a second material that is dissimilar from the first material and also formed in the second optical waveguide 804. In some implementations, the cathode 808 tapers down to the waveguide 804 at the input and output of the waveguide to enable optical transition from waveguide to the cathode 808, as shown as tapers 844 and 846 in FIG. 8A. The anode 810 adjoins the cathode 808 within the second optical waveguide 804. A second capacitor 812 is defined between the anode 810 and the cathode 808. In various implementations, the cathode 808 comprises a step cross-sectional shape to reduce the presence of the first material in areas that are not necessary for carrying out the functions and operations of the second section 802.

The anode 810 is formed on the BOX layer 832 and the cathode 808 is formed above the anode 810 opposite the BOX layer 832. The anode 810 comprises a trench 814 formed therein and the cathode 808 spans the trench 814. The trench 814 may confine the optical mode in the horizontal direction. In various embodiments, the cathode 808 comprises a layer of Group III-V material as the first material. The cathode 808 may be formed by, for example but not limited to, deposition, wafer bonding, monolithic growth, or other fabrication techniques. The anode 810 may comprise silicon or another Group IV material as the second material. The capacitor 812 may be the second MOSCAP defined between the cathode 808 and the anode 810.

A dielectric 816 (also referred to herein as an interfacial layer) is formed between the cathode 808 and the anode 810 and formed in the second optical waveguide 804. The dielectric 816 can be native oxides of the cathode or the anode or both, or external dielectric materials such as high-k dielectrics or polymers which can be formed by deposition, oxidation, wafer bonding or other dielectric coating methods. For example, the dielectric 816 may be similar to dielectric 618 of FIGS. 6A and 6B and may comprise aluminum oxide ($Al_2O_3$), hafnium oxide ($HfO_2$), vanadium dioxide ($VO_2$), or any of the compounds listed in Table 1.

The second MOSCAP 812 forms at the boundary between the first material of the cathode 808 and the underlying second optical waveguide 804. A thin layer of silicon and III-V oxides forms at this boundary and serves as a dielectric for the capacitor (e.g., dielectric 816). In some examples, the dielectric layer 816 may have a nanoscale thickness, for example, the dielectric layer 816 may be a few nanometers thick. For example, as shown in FIGS. 7A-7B, the thickness of dielectric layer 816 may be between nm and 25 nm. As described in connection with FIGS. 7A and 7B, a smaller thickness translates to greater changes in effective refractive index for a smaller voltage bias applied; however, a smaller thickness also translates to greater FCA loss. Thus, some implementations utilize dielectric having a small thickness (e.g., on the order of 5 nm) and account for the FCA loss through gain/loss modulation through the second mesa 822. In some examples, steps need not be taken to encourage the formation of dielectric 816. In other examples, the formation of dielectric 816 may be stimulated, for example by elevating the temperature, exposing the materials to an oxygen-rich atmosphere, or other suitable technique.

Electrode 818 is disposed on the cathode 808 and electrode 820 is disposed on the anode 810. When a voltage bias is applied to electrodes 818 and 820, carrier accumulation or depletion can occur around dielectric 816 based on the polarity of the voltage bias (e.g., forward or reverse bias, respectively), for example, similar to that described above in connection with first MOSCAP 811. Carrier concentration changes in the overlap of the first MOSCAP 811 and the second optical waveguide 804 may lead to changes in waveguide refractive index and propagation loss, for example, as explained in connection with Eqs. 6 and 7, which can be used to modulate the refractive index of the second optical waveguide 804. For example, a voltage bias (e.g., a DC voltage bias) can be applied between anode 810 and cathode 808, causing a thin charge layer to accumulate or deplete on both sides of the dielectric layer 816. The change in free carrier density causes a change in the effective refractive index of the optical mode ($\Delta n_{eff}$), as set forth above in Eqs. 6 and 7 above.

The cathode 808 may comprise negatively-doped material (e.g., a n-doped semiconductor layer comprising silicon or other Group IV) and the anode 810 may comprise a first portion 810a comprising positively-doped material (e.g., a p-doped semiconductor layer). To enhance the change in effective refractive index and optical phase shift induced in the second optical waveguide 804, the anode 810 comprises a second portion 810b formed on the BOX layer 832 adjacent to the first portion 810a opposite the second optical waveguide 804. The electrode 820 may be disposed on the second portion 810b.

In various implementations, the cathode 808 comprises a heavy negatively-doped material, the first portion 810a comprise a positively-doped material, and the second portion comprises a heavily positively doped material. In the illustrative example, the cathode 808 may comprise a Group III-V material having n-type doping concentration of approximately $1e^{18}$ cm$^{-3}$ or more. In another example, the cathode 808 may be doped to between approximately $1e^{18}$ cm$^{-3}$ and approximately $1e^{19}$ cm$^{-3}$. In an example, the first portion 810a may comprise silicon or other Group IV material having p-type doping concentration of approximately $1e^{16}$ cm$^{-3}$ and approximately $5e^{18}$ cm$^{-3}$. In some examples, the second portion 810b may comprise silicon or other Group IV material heavily positively-doped, for example, to greater than approximately $5e^{18}$ cm$^{-3}$.

The second section 802 also includes the second mesa 822, as described above, configured to induce optical loss and/or optical gain similar to that described in connection with the first mesa 821. To achieve modulation of optical gain or optical loss, the second mesa 821 includes an optically active region 826 (or laser gain material in the case of a laser diode) formed on the cathode 808. The optically active region 826 may comprise, for example, QD or QW as an optical gain medium. A semiconductor layer 828 is formed on the optically active region 826. The semiconductor layer 828 may comprise positively-doped Group III-V material, such as GaAs or the like. In one illustrative example, semiconductor layer 828 may be doped with p-type dopants to a concentration of greater than approximately $5e^{18}$ cm$^{-3}$.

Electrode 824 may be formed on the semiconductor layer 828 opposite the optically active region 826. In one example, in a case where a forward voltage bias is applied between the electrodes 824 and 818, carrier concentration change through accumulation leads to stimulated emission in the optically active material 826, thereby generating light. Generated light traverses the layers and is absorbed in the optical energy region 806 and is received at and propagates within the second optical waveguide 804. In another example, responsive to a reverse voltage bias applied between the electrodes 824 and 818, carrier concentration change through depletion leads energy absorption, thereby absorbing light propagating in the second optical waveguide 804 to induce propagation loss.

Accordingly, by biasing the voltage applied between the electrodes 824 and 818, optical gain or loss can be added to the second optical waveguide 804 via second mesa 822. The amount of optical gain or loss may be modulated based on changing the magnitude of the voltage bias applied to the second mesa 822, which may be tuned in view of the loss or gain in the second section 801 to achieve the exceptional point. Additionally, the optical gain to loss ratio may be tuned simultaneously with tuning the refractive index difference between the first and second sections 801 and 802 by controlling the bias applied to electrodes 824 and 818 and the bias applied to electrode 820 and 818. Thus, while a change in gain may also induce a change in refractive index (and vice versa), the refractive index and gain to loss ratio can both be tuned to ensure that power extinction maintained and that the gain to loss ratio is at or exceeds the exception point.

The second mesa 822 also comprises ion region 830 within the semiconductor layer 828. The ion region 830 provides for efficient electrical carrier confinement within the semiconductor layer 828. For example, in the case of induced optical gain, the ion region 830 confines carrier migration to a region that overlaps vertically with the second optical waveguide 804. Thus, the ion region 830 ensures optical gain is generated toward the second optical waveguide 804, and in a horizontal direction such that the optical gain would not be provided to the second optical waveguide 804. The ion region 830, similar to ion region 829, may be formed through an ion implementation process to implant ions into a portion the semiconductor layer 828. The ions may be hydrogen ions ($H^+$) or any other ions as desired for a given application In various examples, the first and second section 801 and 802 may be formed simultaneously. For example, anode 810 and anode 809 may be formed by, for example but not limited to, deposition, wafer bonding, monolithic growth, or other fabrication techniques as a single anode layer. Then the gap 836 may be formed by a chemically dry or wet etching process thereby forming separate anodes 809 and 810 from the anode layer. At the same time or in a different step, the trenches 814 and 813 may be etched from the anode layer. Next, a cathode layer of Group III-V material may be formed on the anodes 809 and 810, for example but not limited to, by deposition, wafer bonding, monolithic growth, or other fabrication techniques as a single cathode layer. An optically active layer may be formed on the cathode layer, for example, by waferbonding a doner wafer that already has the active region. The active regions on the doner wafer are grown by metalorganic chemical vapor deposition or molecular-beam epitaxy. Then another layer of Group III-V material may be formed on the optically active layer, for example but not limited to, by deposition, wafer bonding, monolithic growth, or other fabrication techniques.

Next, an isolation region 838 may be formed in the cathode layer, optically active layer, and the other layer of Group III-V material to form the first and second mesas 821 and 822 by electrically isolating the first and second mesas 821 and 822 from each other. For example, in the illustrative example of FIG. 8B, the isolation region 838 may be an ion region 838a formed through an ion implementation process, similar to that used to form the ion regions 829 and 830, to implant ions into between the mesas 821 and 822. The ions may be hydrogen ions ($H^+$) or any other ions as desired for a given application. As another example, as shown in FIG. 8C, the isolation region 838 may be formed by an etching process to remove material from the cathode layer, optically active layer, and the other layer of Group III-V material to form a gap or space 838b between the first and second mesas 821 and 822. In this case, the gap 836 may be formed as part of forming the isolation region 838, for example, forming gap 838b may include forming gap 836. In either example, the gap 838b or the ion region 838a electrically isolates the first and second mesas 821 and 822 while also forming separate cathodes 808 and 807, optical active regions 826 and 825, and the semiconductor layers 828 and 827. Then electrodes 820, 818, 824, 823, 817, and 819 may be formed, by, for example but not limited to, deposition, wafer bonding, monolithic growth, or other fabrication techniques on the respective layers as shown in FIGS. 8B and 8C.

In various embodiments, as shown in FIGS. 8B and 8C, the dielectrics 815 and 816 may span the gap 836. For example, the dielectrics 815 and 816 may be a single layer spanning the first and second section 801 and 802 as illustrated herein. The single dielectric layer may be disposed on in the gap 836 and covering the sides of anodes 810a and 808b.

While certain materials are described as negatively- or positively-doped, implementations are not limited thereto, and the polarity doping may be switched. For example, while the above example described the cathode 807 as negatively-doped the anode 809 and semiconductor layer 827 as positively-doped, the polarity of each layer may be switched such that the cathode 807 is positively-doped and the anode 809 and semiconductor layer 827 may be negatively-doped. Similarly, the polarity of cathode 808, anode 810, and semiconductor layer 828 layer may be switched such that the cathode 808 is positively-doped and the anode 810 and semiconductor layer 828 may be negatively-doped.

Figure 9:
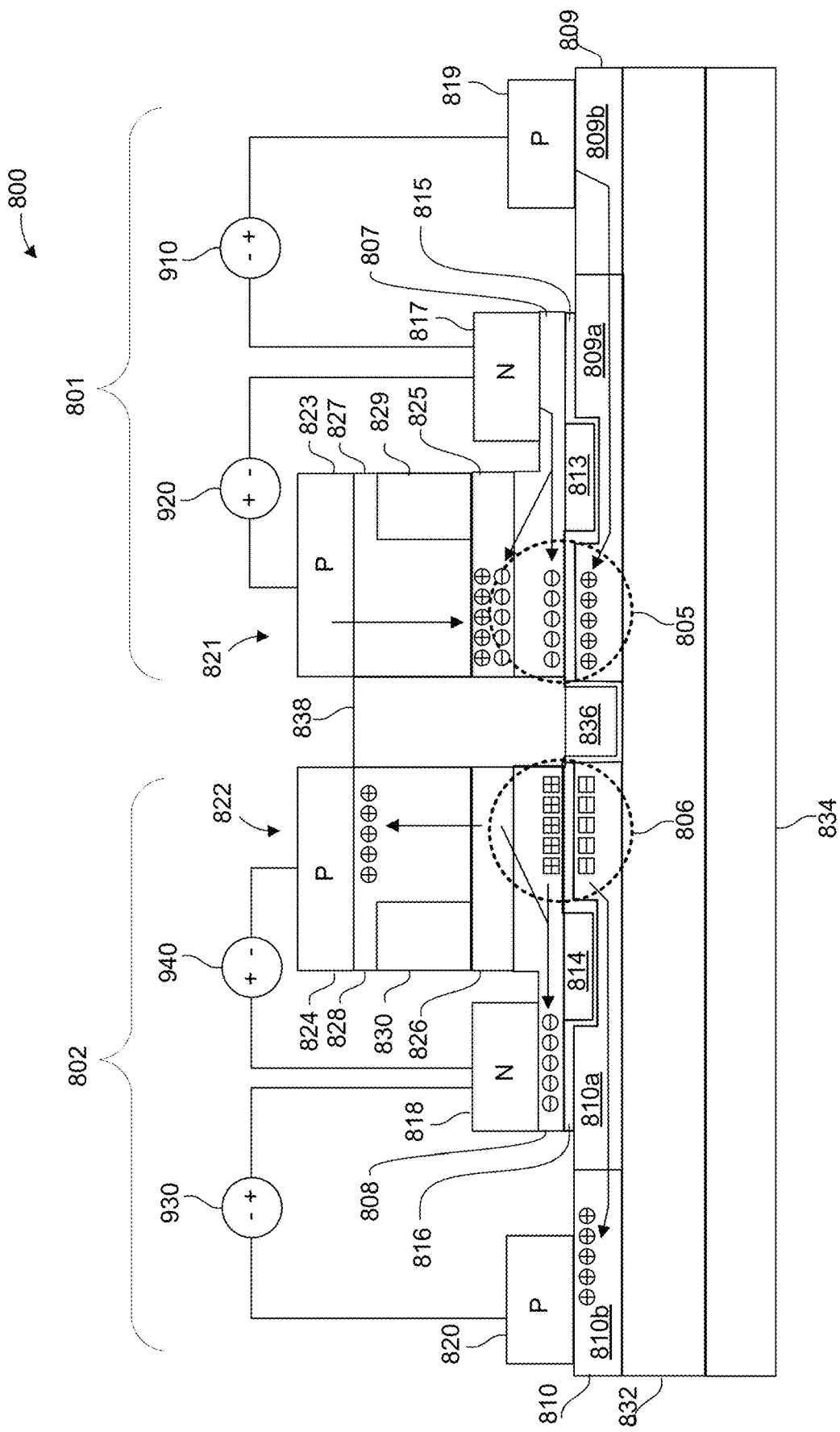
FIG. 9 illustrates carrier concentration migration within the example directional coupler of FIGS. 8A-8C according to an implementation disclosed herein.

FIG. 9 illustrates carrier concentration migration within an example directional coupler according to an implementation disclosed herein. FIG. 9 shows the directional coupler 800 of FIGS. 8A-8C, with carrier concentrations and power sources overlaid thereon.

In the illustrative example shown in FIG. 9, a plurality of power sources are provided. For example, in the first section 801, a first source 910 is electrically coupled between electrodes 817 and 819 and a second source 920 is electrically coupled between electrodes 817 and 823, such that the first and second sources 910 and 920 share a common ground. In the second section 802, a third source 930 is electrically coupled between electrodes 818 and 820 and a fourth source 940 is electrically coupled between electrodes 818 and 824, such that the third and fourth sources 930 and 940 share a common ground. The power sources 910 and 920 may be DC power sources having negative terminals connected to the electrode 817 and positive terminals connected the electrodes 819 and 823, respectively. The power sources 930 and 940 may also be DC power sources having positive terminals connected to the electrode 818 and negative terminals connected the electrodes 820 and 824, respectively. Each power source 910-940 may be controlled, for example, by a controller (e.g., implemented as a computer system described in FIG. 11) to apply voltage bias between respective electrodes. That is, a first bias may be applied between electrode 817 and 819, a second bias applied between electrodes 817 and 823, a third bias applied between electrodes 818 and 820, and a fourth bias applied between electrodes 818 and 824. Each of the first through fourth bias may be applied simultaneously or selectively as desired. Each voltage bias may be independently controlled across respective electrodes as desired to modulate each connected component, for example, each bias may be applied simultaneously or sequentially.

When the first bias is applied by the first source 910 as a forward bias between the electrodes 817 and 819, negative charges and holes accumulate around the dielectric 815 and the first MOSCAP 811 of section 801 operates in accumulation mode. For example, as shown in FIG. 9, negative charges from the cathode 807 migrate to toward the optical energy region 805 (which includes the first optical waveguide 803 therein as shown in FIGS. 8B and 8C) to accumulate on an upper surface of the dielectric 815, and holes (positive charges) migrate from the anode 809 to the first optical waveguide 803 to accumulate on a lower surface of the dielectric 815. The accumulation of charge and change in carrier concentration at the dielectric 815 results in a carrier accumulation effect that changes the refractive index of the first optical waveguide 803 and propagation losses, as described above.

When the third bias is applied by the third source 930 as a reverse bias between the electrodes 818 and 820, the second MOSCAP 812 operates in depletion mode and free carrier concentration around the dielectric 815 move away from the dielectric layer 816 in the optical energy region 806. That is, free carriers (shown as circles with a "+" for positive free carriers or holes and a "−" for negative free carriers or electrons) migrate away from the optical energy region 806 leaving a higher percentage of fixed carriers (shown as boxes with "+" for positive fixed carriers or holes and a "−" for negative fixed carriers or electrons). For example, as shown in FIG. 9, negative charges from the optical energy region 806 migrate to toward the electrode 818 to deplete free carrier concentration and increase fixed carrier concentration at an upper surface of the dielectric 815. Similarly, holes migrate from the optical energy region 806 to the electrode 820 to deplete free carrier concentration and increase fixed carrier concentration at a lower surface of the dielectric 816. The depletion of charge and change in carrier concentration at the dielectric 816 results in a plasma dispersion effect that changes the refractive index of the second optical waveguide 804 (e.g., within optical energy region 806 as shown in FIGS. 8B and 8C) and propagation loss, as described above.

Accordingly, selective control of the first source 910 and/or third power source 930 provides for modulating the refractive index of optical waveguides 803 and/or 804, respectively. As described above, by modulating the refractive index of optical waveguides 803 and/or 804 a refractive index difference therebetween can be varied so as to tune the difference as desired. For example, tuning the refractive index difference enables accounting for attenuation of gain/loss in the systems and maintaining the power extinction for realizing PT symmetric to obtain a PT symmetric direction coupler.

When the second bias is applied by the second source 920 as a forward bias between the electrodes 817 and 823, the first mesa 821 functions to introduce optical gain and control of the second bias provides gain tuning via the first mesa 821. As an illustrative example, negative charges and holes accumulate in the optically active region 825 of the first mesa 821, which function as a pumping source that can provide optical gain. For example, negative charges from the cathode 807 migrate to the optically active region 825, and holes migrate through the semiconductor layer 827 to the optically active region 825. The accumulation of charge and holes in the optically active region 825 provides energy transition states to generate stimulated emissions resulting in optical gain in optical energy region 805, from which light may be emitted. Emitted light propagates through the cathode 807 into the first optical waveguide 803 within optical energy region 805. Thus, optical gain introduced into the first optical waveguide 803 can be modulated through selective control of the second bias. Such modulation can be used to tune the gain to loss ratio of the directional coupler 800 to locate the exceptional point and obtain a PT symmetric directional coupler.

When the fourth bias is applied by the fourth source 940 as a reverse bias between the electrodes 818 and 824, the second mesa 822 functions to introduce optical loss and control of the fourth bias provides loss tuning via the second mesa 822. As an illustrative example, free carriers (e.g., negative charges and holes) deplete from the optically active region 826 of the second mesa 821 leaving an increase in fixed carrier concentration within the optically active region 826, which function to bend the electron-hole band diagrams causing a reduction in bandgap energy and thus absorbing light of a higher energy. This absorption of higher energy light provides for optical loss. Thus, when the fourth bias is applied, higher energy light propagating through in the waveguide 804 is absorbed through the cathode 808. Thus, optical loss introduced into the second optical waveguide 804 can be modulated through selective control of the fourth bias. Such modulation can be used to tune the gain to loss ratio of the directional coupler 800 to locate the exceptional point and obtain a PT symmetric directional coupler.

Through controlled biasing the directional coupler 800 as set forth above in connection with FIG. 9, the refractive index difference can be tuned to maximize the power extinctions at the outputs of the first and second waveguides 803 and 804, while tuning the gain to loss ratio so to provide for optical switching. For example, with reference to FIG. 3A-3C, the first and second MOSCAPS 811 and 812 can be biased to tune the directional coupler 800 to the conditions for FIG. 3A. Simultaneously, the first and second mesas 821 and 822 can be tuned to provide for switching between inputs. As an illustrative example, first light is input into the first waveguide 803 and second light is input second waveguides 804 and the refractive index difference is such that the conditions of FIG. 3A are present in the directional coupler 800. If one desires to switch from first light output from the first waveguide 803 to second light, the first and second mesas 821 and 822 can be tuned to a gain to loss ratio of 870 $cm^{-1}$ as shown in FIG. 3A. At this point the transmitted light intensity matrix $T^{11}$ is −50 dB and the output power corresponds to substantially all the second light input into the second waveguide 804. Alternatively, if one desires to switch from second light output from the first waveguide 804 to second light, the gain to loss ratio can be tuned to 499 $cm^{-1}$ as shown in FIG. 3A. At this point the transmitted light intensity matrix $T^{12}$ is −70 dB and the output power corresponds to substantially all of the first light that is input into the first waveguide 803.

Figure 10:
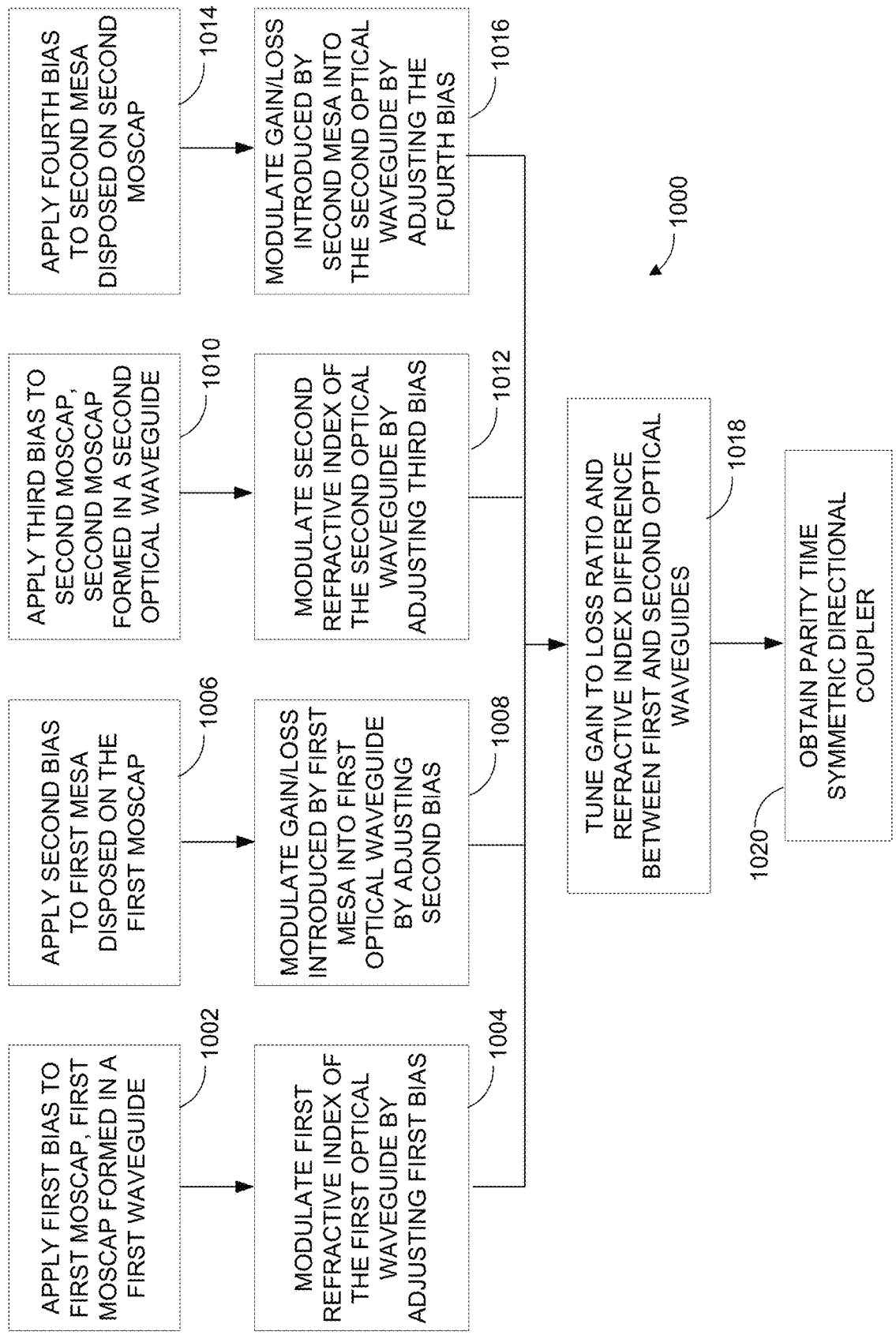
FIG. 10 is an example flow chart illustrating an example process for tuning a directional coupler in accordance with the implementations disclosed herein.

FIG. 10 is an example flow chart illustrating an example process for tuning a directional coupler in accordance with the implementations disclosed herein. In this example, the process may be performed by one or more controllers, for example, implemented as one or more computer systems 1100 of FIG. 11 described below. The flow chart of FIG. 10 may be stored as a set of instructions in a machine-readable storage medium that, when executed by a processor, cause the processor to perform the flow chart. The process may be executed to tune a directional coupler, such as directional coupler 800 described in connection with FIGS. 8A-9.

At block 1002, a first voltage bias is applied to a first MOSCAP. For example, the first MOSCAP may be first MOSCAP 811 that is formed in the first optical waveguide 803. As described above, the first MOSCAP 811 may be formed between anode 809 and cathode 807 having a dielectric 815 therebetween. The first voltage bias may be applied by a power source, such as first source 910 of FIG. 9.

At block 1004, a first refractive index of the first waveguide is modulated by adjusting the first voltage bias. As described above, the first refractive index changes based on carrier concentration in the first MOSCAP responsive to the first voltage bias. That is, for example, the first voltage bias can be adjusted via the one or more controllers, and the carrier concentration at the dielectric layer 815 of the first MOSCAP 811 changes responsive to the adjustments. Based on the changes in carrier concentration, the refractive index of the waveguide is changed as set forth in Eqs. 6 and 7 above.

At block 1006, a second voltage bias is applied to a first mesa disposed on the first MOSCAP. For example, the first mesa may be first mesa 821 disposed on first MOSCAP 811. As described above, the first mesa 821 comprises an optically active region 825 that may be biased to generate optical gain and/or loss based on the polarity of the bias. The second voltage bias may be applied by a power source, such as second source 920 of FIG. 9.

At block 1008, optical gain or optical loss induced in the first waveguide by the first mesa is modulated by adjusting the second voltage bias. As described above, the gain or loss changes based on carrier concentration in the optically active region 825 of the first mesa 821 responsive to the second voltage bias. That is, for example, the second voltage bias can be adjusted via the one or more controllers, and responsive to the adjustments carrier concertation within the optically active region 825 changes. Based on the changes in carrier concentration, the gain or loss (depending on the polarity of the bias) is changed as described above.

At block 1018, a gain to loss ratio and a refractive index difference between the first optical waveguide and a second optical waveguide are tuned based on modulating at least the first refractive index at block 1004 and modulating the optical gain or loss at block 1008. For example, modulating the first refractive index may be used to tune the refractive index difference between the first optical waveguide 803 and the second optical waveguide 804 to maintain a power extinction. Simultaneously, or sequentially before or after, optical gain or loss may be modulated to tune the gain to lose ratio between the first and second optical waveguides 803 and 804 to locate or exceed the exceptional point. By tuning the gain to loss ratio along with the refractive index difference, a PT symmetric directional coupler can be obtained at block 1020, for example, where the gain to lose ratio is tuned to be equal to or exceed the exceptional point while the refractive index difference is tuned to maintain the power extinction.

Optionally, at block 1010, a third voltage bias can be applied to a second MOSCAP. For example, the second MOSCAP may be second MOSCAP 812 that is formed in the second optical waveguide 804. As described above, the second MOSCAP 812 may be formed between anode 810 and cathode 808 having a dielectric 816 therebetween. The third voltage bias may be applied by a power source, such as third source 930 of FIG. 9.

Optionally, at block 1012, a second refractive index of second waveguide can be modulated by adjusting the third voltage bias. As described above, the second refractive index changes based on carrier concentration in the second MOSCAP responsive to the third voltage bias. That is, for example, the third voltage bias can be adjusted via the one or more controllers, and the carrier concentration at the dielectric layer 816 of the second MOSCAP 812 changes responsive to the adjustments. Based on the changes in carrier concentration, the refractive index of the second waveguide is changed as set forth in Eqs. 6 and 7 above.

Optionally, at block 1014, a fourth voltage bias can be applied to a second mesa disposed on the second MOSCAP. For example, the second mesa may be second mesa 822 disposed on second MOSCAP 812 (and thus disposed on second optical waveguide 804). As described above, the second mesa 822 comprises an optically active region 826 that may be biased to generate optical gain and/or loss based on the polarity of the bias. The fourth voltage bias may be applied by a power source, such as fourth source 940 of FIG. 9.

Optionally, at block 1016, optical gain or optical loss induced in the second waveguide by the second mesa is modulated by adjusting the fourth voltage bias. As described above, the gain or loss changes based on carrier concentration in the optically active region 826 of the second mesa 822 responsive to the fourth voltage bias. That is, for example, the fourth voltage bias can be adjusted via the one or more controllers, and carrier concertation within the optically active region 826 changes responsive to the adjustments. Based on the changes in carrier concentration, the gain or loss (depending on the polarity of the bias) is changed as described above.

The operations of block 1018 may comprise the modulations of blocks 1016 and 1012, in the case that such processes are performed. For example, modulation of the first and second refractive indices may be used to tun the refractive index difference between the first and second optical waveguides at block 1018. Additionally, modulation of the gain and lose via the first and second mesas 821 and 822 provides for tunning the gain to lose ratio at block 1018.

Figure 11:
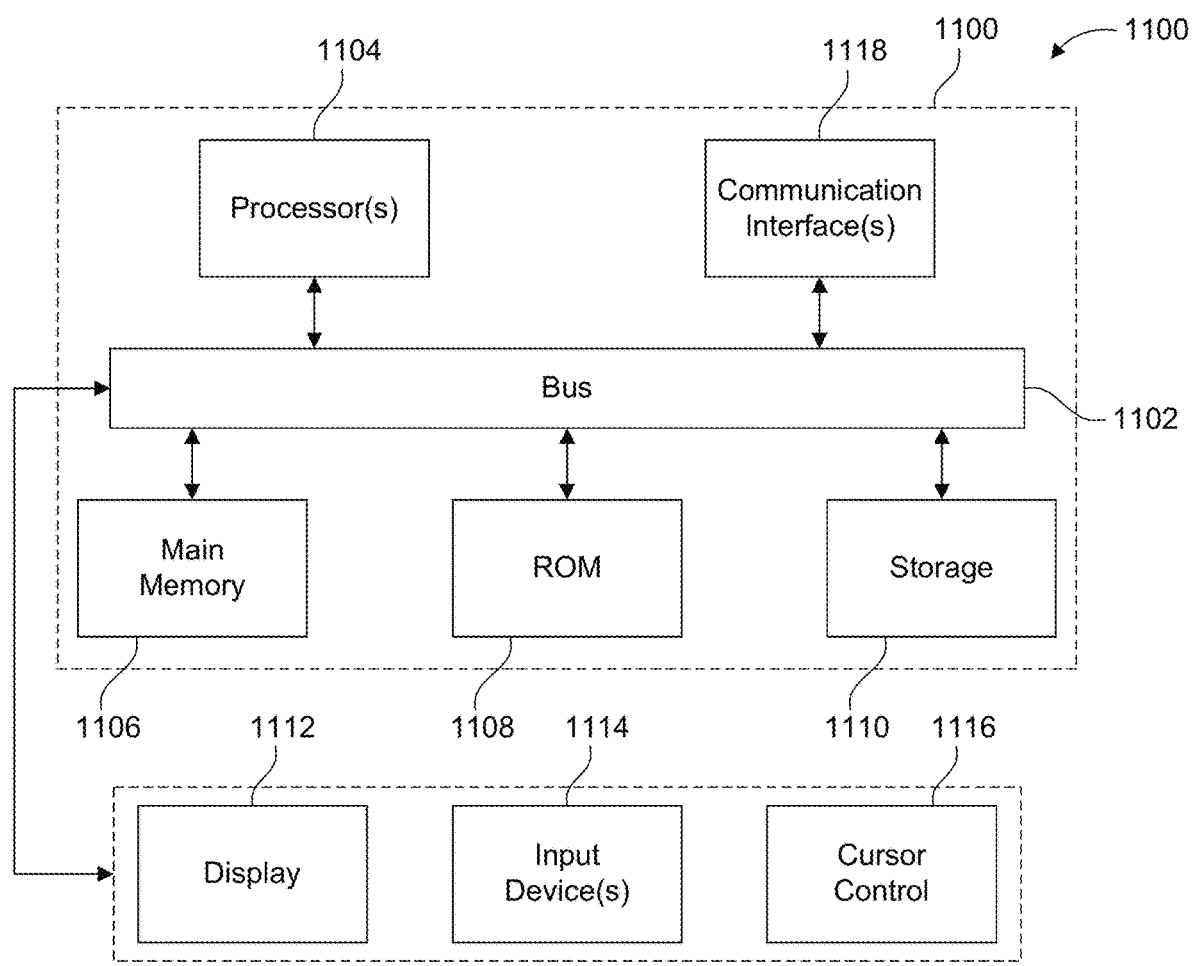
FIG. 11 is an example computer system that may be used to implement various features of the various optical devices of the present disclosure.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors. As described above, computer system 1100 may be implemented for controlling the power sources described above (e.g., one or more of power sources 910, 920, 930, and/or 940).

The computer system 1100 also includes a main memory 1106, such as a random-access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information. Communication interface 1118 may be communicatively coupled to one or more power sources (e.g., one or more of power sources 450, 460, 550, 560, 650, and 660 of FIGS. 4-6).

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution. Accordingly, the computer system 1100 may be configured to control voltage bias applied between contact electrodes by sending instructions to one or more power sources according to instructions stored in main memory 1106 and/or ROM 1108 over communication interface(s) 1118.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A hybrid III-V/silicon device comprising:
   a first silicon layer disposed over a buried oxide (BOX) layer, wherein the first silicon layer includes:
      a first doped region having a first trench,
      a second doped region having a second trench,
      a first gap region disposed between the first doped region and the second doped region;
   a first oxide layer disposed over the first doped region and the second doped region;
   a first mesa disposed on the first doped region of the first silicon layer, wherein the first mesa includes:
      a first Group III-V layer disposed over the first oxide layer;
      a first optically active region disposed over the first Group III-V layer; and
      a second Group III-V layer disposed over the optically active region; and
   a second mesa disposed on the second doped region of the first silicon layer, wherein the second mesa includes:
      a third Group III-V layer disposed over the first oxide layer;
      a second optically active region disposed over the third Group III-V layer; and
      a fourth Group III-V layer disposed over the second optically active region.

2. The hybrid III-V/silicon device of claim 1, wherein the first oxide layer includes at least one of $HfO_2$, $Al_2O_3$, and $VO_2$.

3. The hybrid III-V/silicon device of claim 1, wherein the first and second optically active regions are one of a quantum dot layer, a quantum well layer, and a quantum dash layer.

4. The hybrid III-V/silicon device of claim 1, wherein the first, second, third, and fourth Group III-V layer comprises one of gallium arsenide and indium phosphide.

5. The hybrid III-V/silicon device of claim 1, further comprising:
   a first waveguide disposed in the first doped region between the first trench and the gap region; and
   a second waveguide disposed in the second doped region between the second trench and the gap region.

6. The hybrid III-V/silicon device of claim 1, wherein
   the second Group III-V layer comprises a first ion region, and
   the fourth Group III-V layer comprises a second ion region.

7. The hybrid III-V/silicon device of claim 1, wherein
   the gap region is disposed between the first and second mesas, and
   an isolation region is disposed on the first gap region between the first and second mesas.

8. The hybrid III-V/silicon device of claim 7, wherein the isolation region comprises a third ion region.

9. The hybrid III-V/silicon device of claim 7, wherein the isolation region comprises a second gap region.

10. The hybrid III-V/silicon device of claim 1, wherein the first and second doped regions are doped with a first polarity and the first, second, third, and fourth Group III-V layers are doped with a second polarity dissimilar from the first polarity.

11. The hybrid III-V/silicon device of claim 10, wherein the first polarity is p-type and the second polarity is n-type.

12. A directional coupler, comprising:
   a buried oxide (BOX) layer;
   a first metal oxide semiconductor (MOS) capacitor formed on the BOX layer, the first MOS capacitor comprising:
      a first optical waveguide;
      a first cathode comprising a first material and formed in the first optical waveguide;
      a first anode formed in the first optical waveguide, the first anode comprising a second material different from the first material; and
      a first dielectric disposed between the first cathode and the first anode, the first dielectric comprising an oxide of the first material and an oxide of the second material, wherein the first MOS capacitor is defined between the first anode and the first cathode; and
   a first mesa disposed on the first MOS capacitor, the first mesa comprising:
      the first anode;
      a first optically active region disposed on the first anode; and a first semiconductor layer comprising the second material disposed on the optically active region; and
a second optical waveguide disposed on the BOX layer adjacent to the first optical waveguide having a first gap between the first and second optical waveguides.

13. The directional coupler of claim 12 further comprising:
a second MOS capacitor formed on the BOX layer, the second MOS capacitor comprising:
the second optical waveguide;
a second cathode comprising the first material and formed in the second optical waveguide;
a second anode formed in the second optical waveguide, the second anode comprising the second material; and
a second dielectric disposed between the second cathode and the second anode, the second dielectric comprising the oxide, wherein the second MOS capacitor is defined between the second anode and the second cathode.

14. The directional coupler of claim 12 further comprising:
a second mesa disposed on the second waveguide, the second mesa comprising:
a second anode formed in the second optical waveguide, the second anode comprising the second material;
a second optically active region disposed on the first anode; and
a second semiconductor layer comprising the second material disposed on the optically active region.

15. A method for tuning a directional coupler, the method comprising:
applying a first voltage bias to a first metal oxide semiconductor (MOS) capacitor, the first MOS capacitor formed in a first optical waveguide;
modulating a first refractive index of the first optical waveguide by adjusting the first voltage bias, wherein the first refractive index changes based on carrier concentration in the first MOS capacitor responsive to the first voltage bias;
applying a second voltage bias to a first mesa disposed on the first MOS capacitor, the first mesa comprising a first optically active region;
modulating optical gain or optical loss introduced by the first mesa into the first optical waveguide by adjusting the second voltage bias, wherein the optical gain or the optical lose changes based on carrier concentration in the first optically active region responsive to the second voltage bias; and
tuning a gain to loss ratio and refractive index difference between the first optical waveguide and a second optical waveguide based on modulating the first refractive index and the optical gain or optical loss.

16. The method of claim 15, wherein:
the first and second voltage bias are forward voltage bias, and
optical gain is introduced by the first mesa into the first optical waveguide based on adjusting the second voltage bias.

17. The method of claim 15, further comprising:
applying a third voltage bias to a second metal oxide semiconductor (MOS) capacitor, the second MOS capacitor formed in a second optical waveguide; and
modulating a second refractive index of the second optical waveguide by adjusting the third voltage bias, wherein the second refractive index changes based on carrier concentration in the second MOS capacitor responsive to the third voltage bias.

18. The method of claim 15, further comprising:
applying a fourth voltage bias to a second mesa disposed on the second optical waveguide, the second mesa comprising a second optically active region; and
modulating optical gain or optical loss introduced by the second mesa into the second optical waveguide by adjusting the fourth voltage bias, wherein the optical gain or the optical lose changes based on carrier concentration in the second optically active region responsive to the fourth voltage bias.

19. The method of claim 18, wherein:
the fourth voltage bias is a reverse voltage bias, and
optical loss is introduced by the second mesa into the second optical waveguide based on adjusting the fourth voltage bias.

20. The method of claim 15, further comprising:
obtaining a parity time symmetric directional coupler based on tuning the gain to loss ratio and the refractive index difference between the first optical waveguide and a second optical waveguide.

* * * * *